(12) United States Patent
Hou et al.

(10) Patent No.: US 12,384,036 B2
(45) Date of Patent: Aug. 12, 2025

(54) GENERAL-PURPOSE COMPUTER-BASED ROBOT CONTROL SYSTEM

(71) Applicant: HANGZHOU KAIERDA WELDING ROBOT CO., LTD., Hangzhou (CN)

(72) Inventors: Runshi Hou, Hangzhou (CN); Xiuquan Wei, Hangzhou (CN); Shenghua Wang, Hangzhou (CN)

(73) Assignee: HANGZHOU KAIERDA WELDING ROBOT CO., LTD., Zhejiang (CN)

( * ) Notice: Subject to any disclaimer, the term of this patent is extended or adjusted under 35 U.S.C. 154(b) by 327 days.

(21) Appl. No.: 18/009,912

(22) PCT Filed: Jun. 10, 2021

(86) PCT No.: PCT/CN2021/099302
§ 371 (c)(1),
(2) Date: Dec. 12, 2022

(87) PCT Pub. No.: WO2021/249457
PCT Pub. Date: Dec. 16, 2021

(65) Prior Publication Data
US 2023/0226692 A1 Jul. 20, 2023

(30) Foreign Application Priority Data
Jun. 10, 2020 (CN) .......................... 202010523287.1

(51) Int. Cl.
*B25J 9/16* (2006.01)
(52) U.S. Cl.
CPC ........... *B25J 9/1674* (2013.01); *B25J 9/1653* (2013.01)

(58) Field of Classification Search
CPC ...... B25J 9/1674; B25J 9/1653; B25J 9/0081; B25J 9/16; B25J 9/1602; B25J 9/161; G05B 19/0428; G05B 2219/50198
See application file for complete search history.

(56) References Cited

U.S. PATENT DOCUMENTS

| | | |
|---|---|---|
| 2002/0045970 A1 | 4/2002 | Krause et al. |
| 2016/0011899 A1 | 1/2016 | Machida |

(Continued)

FOREIGN PATENT DOCUMENTS

| | | |
|---|---|---|
| CN | 202735763 U | 2/2013 |
| CN | 103077640 A | 5/2013 |

(Continued)

*Primary Examiner* — Harry Y Oh
(74) *Attorney, Agent, or Firm* — Muncy, Geissler, Olds & Lowe, P.C.

(57) ABSTRACT

A robot control system includes a robot controller, a data transmission module, a servo drive module, a safety unit, a demonstrator, and a power module. The servo drive module is connected to the robot controller via the data transmission module and receives a movement instruction to drive a robot to move. The safety unit is connected to the robot controller and the servo drive module via the data transmission module and turns off, upon receiving an abnormal input signal or a failure signal, the servo drive module and transmits the abnormal input signal or the failure signal to the robot controller. The demonstrator receives a terminal video signal and a first control interaction signal from the robot controller, and sends a second control interaction signal to the robot controller to control operation of the robot controller. The power module is electrically connected to the robot controller and the safety unit.

20 Claims, 16 Drawing Sheets

(56) References Cited

U.S. PATENT DOCUMENTS

2016/0025850 A1 1/2016 Rigsby et al.
2020/0028405 A1* 1/2020 Sugimori ............. B62D 5/0424

FOREIGN PATENT DOCUMENTS

| | | | |
|---|---|---|---|
| CN | 105204392 | A | 12/2015 |
| CN | 205043783 | U | 2/2016 |
| CN | 105666505 | A | 6/2016 |
| CN | 106227317 | A | 12/2016 |
| CN | 110605712 | A | 12/2019 |
| CN | 111736514 | A | 10/2020 |
| CN | 111781891 | A | 10/2020 |
| CN | 112684756 | A * | 4/2021 |
| JP | H04238504 | A | 8/1992 |
| JP | 2003053688 | A | 2/2003 |
| JP | 2007283448 | A | 11/2007 |
| JP | 2009000782 | A | 1/2009 |
| JP | 2009522116 | A | 6/2009 |
| WO | WO 2014/132466 | A1 | 4/2014 |

* cited by examiner

GENERAL-PURPOSE COMPUTER-BASED ROBOT CONTROL SYSTEM

FIELD OF TECHNOLOGY

The present invention relates to the field of industrial computers, in particular to a general-purpose computer-based robot control system.

BACKGROUND

With the continuous promotion of industrial automation, most production lines have been automated, and various industrial robots are used in different production lines for different application scenarios, thus saving a lot of human and financial resources and greatly improving work efficiency. As the scope of application of robots continues to expand, the degree of intelligence of robots is also increasing, both in terms of internal data processing capabilities and capabilities to respond to external inputs. However, this increase in degree of intelligence has put a great deal of pressure on internal data communication capabilities and communication costs of robots.

In addition, safety is the first priority for industrial robots. In an existing control system for industrial robots, safety logic is primarily implemented by a separate module (i.e., a safety unit) in a robot control cabinet. For example, when an emergency stop signal is input externally or by a demonstrator, the safety unit outputs a safety signal to turn off the output of a servo drive module, so as to realize an emergency stop of robot actions to ensure safety. In the existing logic control, the control of safety logic is executed entirely by the safety unit, which is a separate module. Once the safety unit or a safety circuit transmitting a safety signal fails, such control method may fail completely, and a robot may not be able to make an emergent stop in response to the emergency stop signal. Therefore, there is a problem of low safety level.

SUMMARY

The present invention provides a general-purpose computer-based robot control system in order to overcome the problems of high hardware dependence, poor scalability, and high cost of existing robot control systems.

In order to achieve the above objective, the present invention provides a general-purpose computer-based robot control system. The system includes a robot controller, a data transmission module, a servo drive module, a safety unit, a demonstrator, and a power module. The servo drive module is connected to the robot controller via the data transmission module and receives a movement instruction from the robot controller to drive a robot to move. The safety unit is connected to the robot controller and the servo drive module respectively via the data transmission module, and upon receiving an abnormal input signal or a failure signal, turns off the servo drive module and transmits the abnormal input signal or the failure signal to the robot controller. The demonstrator receives a terminal video signal and a first control interaction signal from the robot controller, and at the same time, sends a second control interaction signal to the robot controller to control operation of the robot controller. The power module is electrically connected to the robot controller and the safety unit.

According to one embodiment of the present invention, the safety unit, the servo drive module and a bus transmission master in the data transmission module are interconnected, the safety unit and the bus transmission master monitor each other, a first safety circuit is established between the safety unit and the servo drive module, and a second safety circuit is established between the bus transmission master and the servo drive module;

a first safety control signal is generated in the first safety circuit to turn off the output of the servo drive module in the case that the safety unit receives the abnormal input signal, or monitors that the bus transmission master fails or the safety unit fails; and at the same time, a second safety control signal is generated in the second safety circuit to turn off the output of the servo drive module in the case that the bus transmission master receives the abnormal input signal from the safety unit, or monitors that the bus transmission master fails or the safety unit fails.

According to one embodiment of the present invention, a real-time operation module in the robot controller is connected to the bus transmission master; and in the case that the real-time operation module fails:

the bus transmission master outputs the first safety control signal via the first safety circuit to turn off the output of the servo drive module, and at the same time, outputs a failure signal of the real-time operation module to the safety unit; and the safety unit outputs the second safety control signal via the second safety circuit to turn off the output of the servo drive module.

According to one embodiment of the present invention, the robot controller further includes a non-real-time operation module; and in the case that the non-real-time operation module fails, the real-time operation module acquires a failure signal of the non-real-time operation module and outputs the failure signal to the bus transmission master, and the bus transmission master turns off the output of the servo drive module via the first safety circuit and the second safety circuit.

According to one embodiment of the present invention, the robot controller further has a storage module, the real-time operation module and the non-real-time operation module share the storage module, and the real-time operation module and the non-real-time operation module acquire live signals of the other party via the shared storage module respectively so as to monitor statuses of the other party.

According to one embodiment of the present invention, the non-real-time operation module is connected to the safety unit, and the safety unit monitors a status of the non-real-time operation module;

in the case that the real-time operation module fails, the non-real-time operation module outputs the failure signal to the safety unit, and the safety unit outputs the first safety control signal to turn off the output of the servo drive module; and in the case that the non-real-time operation module fails, the safety unit outputs the first safety control signal to turn off the output of the servo drive module upon detecting the failure signal.

According to one embodiment of the present invention, the safety unit transmits the abnormal input signal to the non-real-time operation module in response to receiving the abnormal input signal, the non-real-time operation module transmits the abnormal input signal to the real-time operation module via a storage module, and the real-time operation module triggers the bus transmission master to output the second safety control signal to turn off the output of the servo drive module.

According to one embodiment of the present invention, the power module includes:

a power conversion circuit;

a controller power module, connected to an output end of the power conversion circuit and supplying power to the robot controller;

a network voltage detection module, connected to the power conversion circuit to detect an input voltage of the power conversion circuit, in the case that a main circuit is powered off and the input voltage of the power conversion circuit is below a set threshold, the power module with a power-off protection function outputting a power-off trigger signal to trigger the robot controller for power-off storage; and an energy storage module, connected to the controller power module, the energy storage module storing energy during normal operation of the power conversion circuit; in the case that the input voltage of the power conversion circuit is below the set threshold, the energy storage module outputting the energy to cause the controller power module to operate normally, the controller power module supplying power to the robot controller to cause the robot controller to complete data storage.

According to one embodiment of the present invention, the energy storage module includes a capacitor connected between a positive bus and a negative bus of the power conversion circuit, and the capacitor is charged during normal power supply of the power conversion circuit; and in the case that the input voltage of the power conversion circuit is below the set threshold, the capacitor releases energy to the controller power module to cause the controller power module to operate normally.

According to one embodiment of the present invention, the power module further includes an output capacitor in crossover connection with an output end of the controller power module, the output capacitor stores energy during the normal operation of the power conversion circuit, and in the case that the input voltage of the power conversion circuit is below the set threshold, the output capacitor discharges, and the energy released by the output capacitor is superimposed with the energy output by the energy storage module and then output to the robot controller.

According to one embodiment of the present invention, the general-purpose computer-based robot control system further includes a power timing management unit, and the power timing management unit includes:

a power determining module, determining an output status of the power module in the case that the main circuit is powered on again after being powered off;

a controller determining module, determining whether the robot controller is turned off in the case that the power module is in a power-off protection output status; and a timing control module, outputting a power-on trigger signal to the robot controller to cause the robot controller to restart operation modules in the case that the robot controller is turned off, and monitoring a status of a demonstrator program in the robot controller or a power-off signal of a main board of the robot controller in real time in the case that the robot controller is still not turned off;

upon monitoring that the demonstrator program is closed, the robot controller is turned off after a delay for a preset time, and the power-on trigger signal is output to the robot controller to cause the robot controller to restart the operation modules after the delay is over; or the power-on trigger signal is output to the robot controller to cause the robot controller to restart the operation modules upon receiving the power-off signal of the main board of the robot controller.

According to one embodiment of the present invention, in the case that the power module is in the power-off protection output status and the robot controller is still not turned off, the timing control module monitors and determines a live signal output from the demonstrator program in the robot controller at intervals, and determines that the demonstrator program is closed in the case that no live signal is received within a preset interval.

According to one embodiment of the present invention, in the case that the robot controller is turned off, the timing control module opens and then closes a path between the power module and the robot controller, so as to provide the power-on trigger signal with a rising edge for the robot controller.

According to one embodiment of the present invention, in the case that the main circuit is powered off, the power module enters the power-off protection output status and outputs the power-off trigger signal to the robot controller, so as to trigger the robot controller for the power-off storage.

According to one embodiment of the present invention, the demonstrator includes:

a receiving module, receiving the terminal video signal and the first control interaction signal from the robot controller;

a display module, displaying the received terminal video signal on the demonstrator, and in response to the received first control interaction signal, displaying information of the first control interaction signal in a corresponding display region on the demonstrator;

an input signal acquisition module, acquiring a signal input by a panel of the demonstrator or a signal input from other terminals to form the second control interaction signal; and a sending module, sending the second control interaction signal to the robot controller to control the operation of the robot controller.

According to one embodiment of the present invention, the demonstrator further includes:

a decoding module, electrically connected to the receiving module and outputting the terminal video signal and the first control interaction signal output from the receiving module to the display module after decoding processing; and an encoding module, electrically connected to the input signal acquisition module and outputting the second control interaction signal to the sending module after encoding.

According to one embodiment of the present invention, the data transmission module includes:

the bus transmission master, connected to the robot controller, the robot controller being connected to a plurality of drive modules via the bus transmission master to control a movement status of the robot;

a first interface module, connected to the robot controller via the bus transmission master and transmitting a first type of signals; and a second interface module, connected to the robot controller and transmitting a second type of signals, the first interface module having a higher transmission speed than the second interface module, the robot controller having a higher response level to the first type of signals than to the second type of signals.

According to one embodiment of the present invention, a bus transmission communication network is an EtherCAT network, the bus transmission master is an EtherCAT master, and the first interface module and the plurality of drive modules are used as EtherCAT slaves of the bus transmission master.

According to one embodiment of the present invention, the robot controller controls the servo drive module by using a master-slave coordination-based robot control method, and the master-slave coordination-based robot control method includes:

reading instructions in a robot job program;

parsing the read instructions to obtain number information of each robot, current movement information, and set current master-slave information representing a master-slave relationship of each robot;

matching corresponding movement parameters for each robot from a movement parameter profile based on the parsed number information, current movement information, and current master-slave information of each robot; and based on the matched movement parameters of each robot and the current master-slave information, calling a master-slave coordination control algorithm for master-slave coordination control.

According to one embodiment of the present invention, the robot controller controls the servo drive module by using a gain control method based on a robot job program, and the gain control method based on the robot job program includes:

reading each instruction in the robot job program in sequence;

in the case that the read instruction is a movement instruction, parsing a movement speed, a trajectory type, and trajectory type parameters of the robot in each read movement instruction;

acquiring corresponding gain parameters based on the parsed movement speed and trajectory type of the robot; and based on the parsed movement speed, trajectory type and trajectory type parameters and the corresponding gain parameters, generating robot movement instructions and outputting the robot movement instructions to servo motor drivers on each axis of the robot.

In summary, the power module in the general-purpose computer-based robot control system according to the present invention continues to supply power to the robot controller after the main circuit is powered off, so as to cause the operation modules in the robot controller to complete data storage, thereby realizing power-off protection of the data. The safety unit provides control with the plurality of safety circuits to ensure that the servo drive module can accurately respond to abnormal inputs or failures, thereby enabling emergency stops. Further, since the safety unit and the bus transmission master monitor each other, in the case that either the safety unit or the bus transmission master fails, the servo drive module can respond to the failure, realizing safety interlocked control of a plurality of modules and greatly improving the level of safety control. In the data transmission module, the combination of the first interface module extended based on the bus transmission master with the standard second interface module not only realizes the rapid transmission of data requiring high response, but also greatly reduces the cost of the transmission module. On the demonstrator, the demonstrator program runs on the robot controller, and the demonstrator receives the terminal video signal from the robot controller to achieve real-time display of the operation status of the robot. In this solution, there is no need to embed a separate CPU in the demonstrator, so that the cost of the demonstrator is greatly reduced. In addition, as the demonstrator program is executed by a high-performance industrial personal computer in the robot controller, the program has very powerful operational capabilities and high operational speed, thus enabling better and more accurate control of robot movements.

In order to make the above and other objectives, features and advantages of the present invention more clearly understood, preferred embodiments are given below, and are illustrated in detail below with reference to the accompanying diagrams.

DESCRIPTION OF THE EMBODIMENTS

Figure 1:
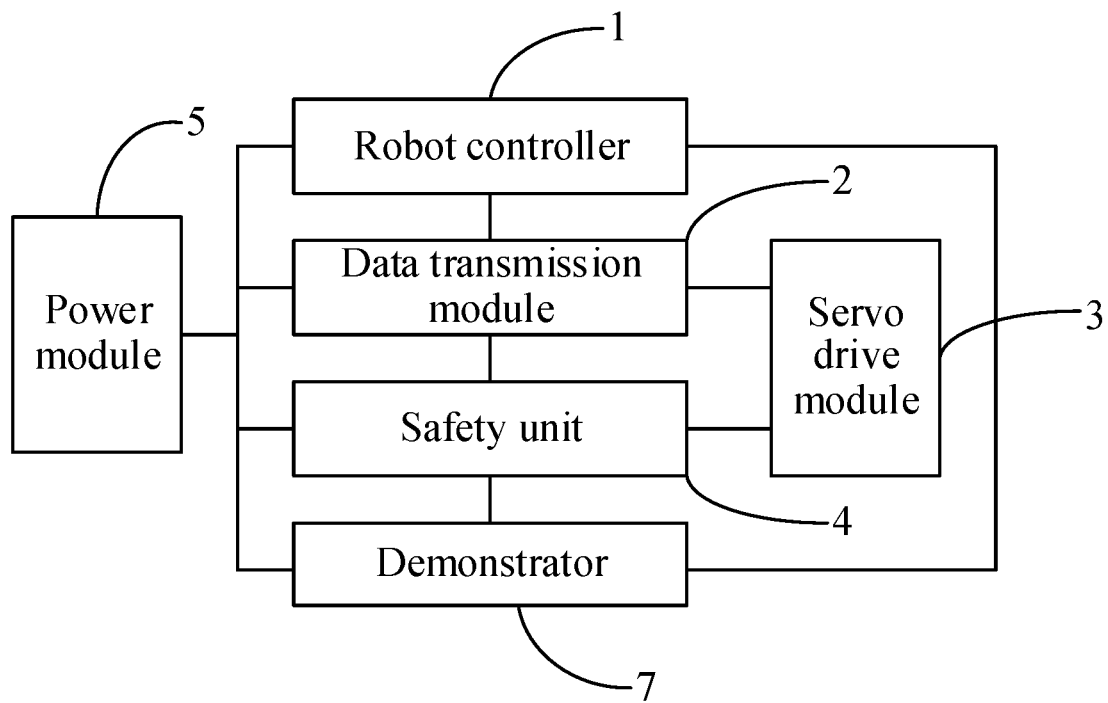
FIG. 1 shows a block diagram of a general-purpose computer-based robot control system according to the present invention.

As shown in FIG. 1, a general-purpose computer-based robot control system according to this embodiment includes a robot controller 1, a data transmission module 2, a servo drive module 3, a safety unit 4, a power module 5, and a demonstrator 7. The servo drive module 3 is connected to the robot controller 1 via the data transmission module 2, and receives a movement instruction from the robot controller 1 to drive a robot to move. The safety unit 4 is connected to the robot controller 1 and the servo drive module 3 via the data transmission module 2, and upon receiving an abnormal input signal or a failure signal, turns off the servo drive module 3 and transmits the abnormal input signal or the failure signal to the robot controller 1. The demonstrator 7 receives a terminal video signal and a first control interaction signal from the robot controller 1, and at the same time, sends a second control interaction signal to the robot controller 1 to control operation of the robot controller 1. The power module 5 is electrically connected to the robot controller 1 and the safety unit 4.

Figure 2:
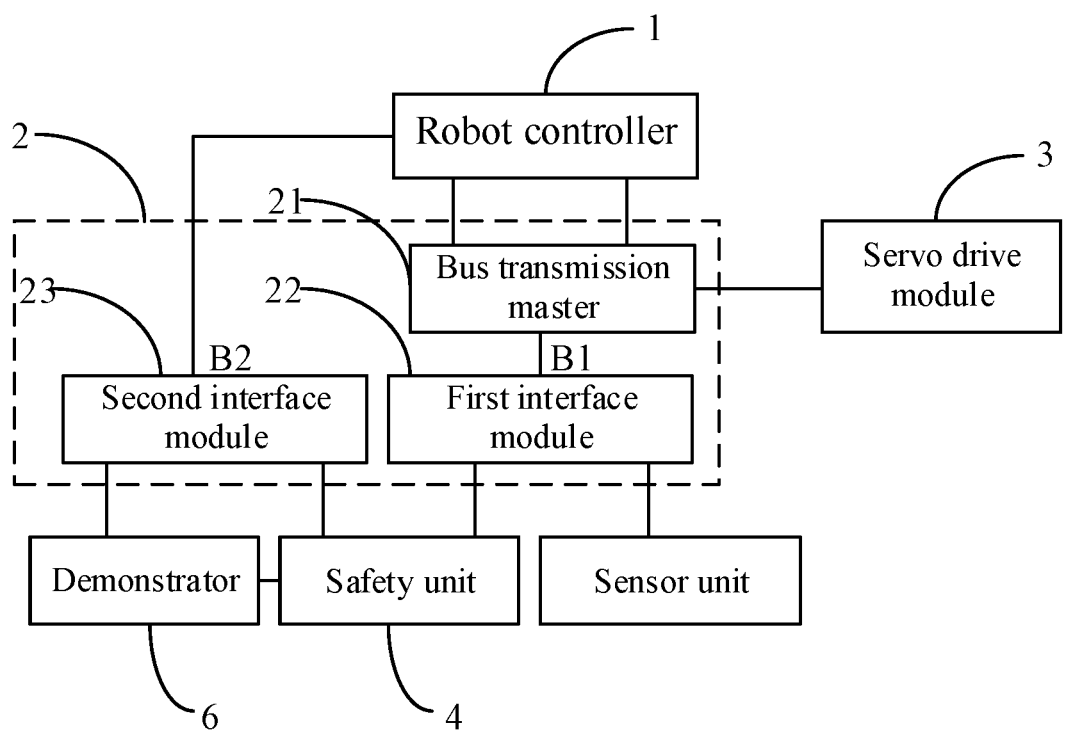
FIG. 2 shows a block diagram of a data transmission module and a robot controller.
Figure 3:
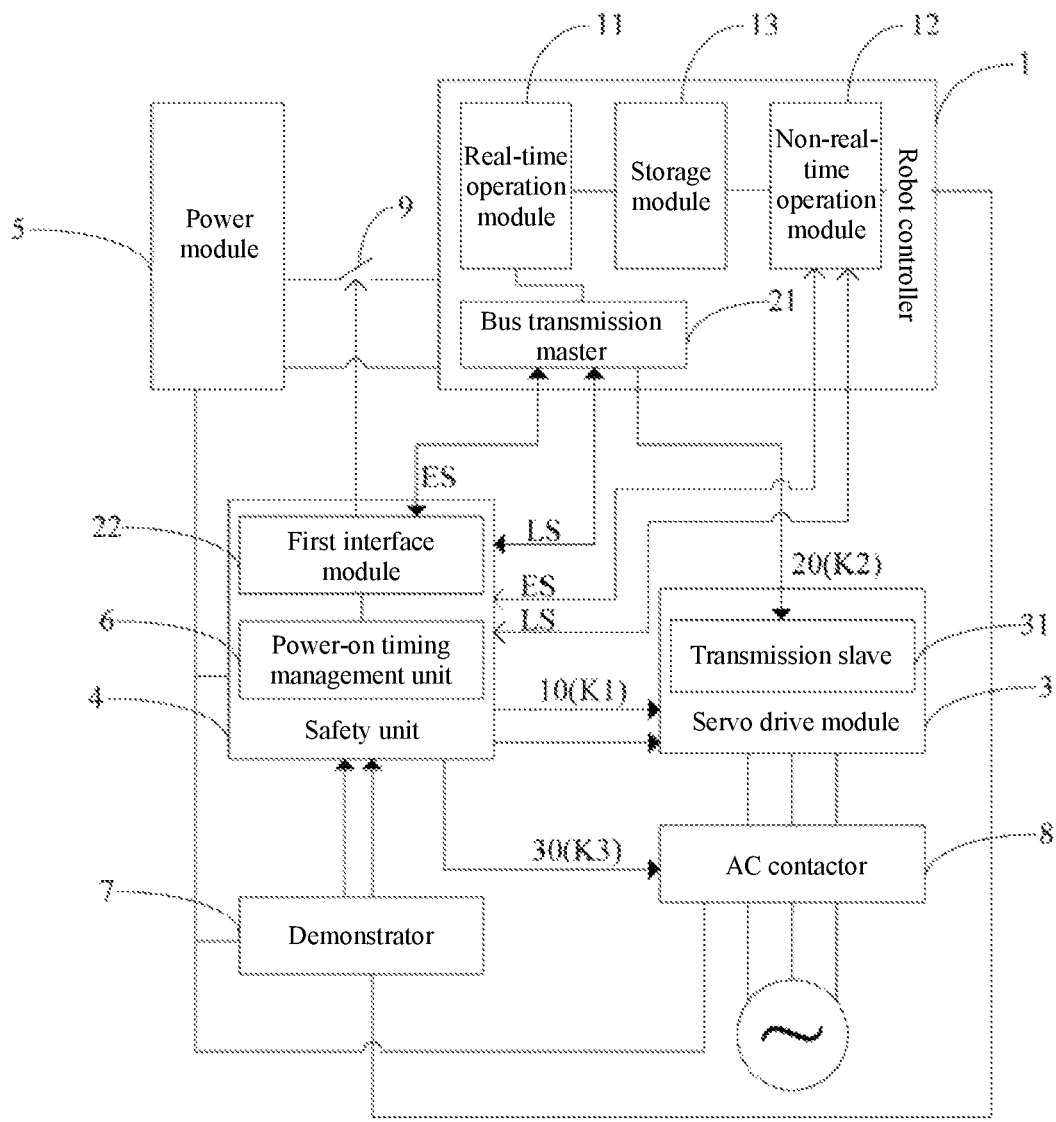
FIG. 3 shows a block diagram of safety control of a safety unit.

In this embodiment, as shown in FIG. 2 and FIG. 3, the data transmission module 2 includes a bus transmission master 21, a first interface module 22, and a second interface module 23. The bus transmission master 21 is connected to the robot controller 1. The robot controller 1 is connected to the servo drive module 3 via the bus transmission master 21 to control a movement status of the robot. The first interface module 22 is connected to the robot controller 1 via the bus transmission master 21, and transmits a first type of signals B1. The second interface module 23 is connected to the robot controller 1, and transmits a second type of signals B2. The first interface module 22 has a higher transmission speed than the second interface module 23, and the robot controller 1 has a higher response level to the first type of signals B1 than to the second type of signals B2.

In this embodiment, the first type of signals B1 include a safety signal input by the safety unit 4, a sensing signal input by a sensor unit, a switching signal or a synchronization signal, and other signals with high-speed response requirements. The second type of signals B2 are general control or communication signals that do not require high transmission speed, such as an instruction signal input from the demonstrator.

In this embodiment, the bus transmission master 21 is an EtherCAT bus transmission master, and the robot controller 1 and the servo drive module 3 transmit data via an EtherCAT bus. EtherCAT (Ethernet control automation technology) is a field bus transmission master with an open architecture based on Ethernet. The first interface module 22 is an extended interface module based on the EtherCAT bus, and takes advantage of high-speed transmission of the EtherCAT bus for fast transmission and response of the first type of signals B1. The second interface module 23 is a standard USB interface. However, the present invention does not limit this in any way. In other embodiments, other bus transmission masters, such as EtherNET, may be used. The second interface module may be a standard serial interface, such as an RS232 interface or an RS485 interface. Further, in other embodiments, the second interface module may also include a USB interface and a serial interface at the same time.

The data response speed of the bus-based first interface module 22 is much higher than the data transfer speed of the second interface module 23, and the difference between the two may be 10 times or more. Specifically, in this embodiment, the data response time of the EtherCAT bus-based first interface module 22 is within 1 ms, and the data response time of the standard USB interface used as the second interface module 23 is within 50 ms. However, the present invention does not limit this in any way.

In this embodiment, the robot controller 1 is an industrial computer, and EtherCAT software, such as TwinCAT, is mounted in the robot controller 1. The robot controller 1 is used as an EtherCAT bus master. The first interface module 22 and the servo drive module 3 are used as bus slaves of the bus transmission master 21. Specifically, the first interface module 22 and the servo drive module 3 each become the EtherCAT bus master via a controller of the AX58100 series. However, the present invention does not limit this in any way. In other embodiments, the bus transmission master may be independent of the robot controller, and the robot controller may also be a general-purpose computer system such as a personal computer.

In this embodiment, the data transmission module 2 integrates the first interface module 22 with high-speed transmission capabilities and the second interface module 23 with common low-speed transmission characteristics. The first interface module 22 is used for transmitting the first type of signals B1 that require high-speed response, and the second interface module 23 is used for transmitting the second type of signals that do not require high timeliness of data transmission. In the robot control system, there are not many first type of signals B1 that require high-speed response, but more second type of signals B2. Therefore, only a few first interface modules 22 need to be extended in the data transmission module 2, and the traditional and standard second interface module 23 may still be used for most of the second type of signals B2. In this way, the robot control system according to this embodiment greatly reduces the cost while meeting the requirement of high-speed transmission of the first type of signals B1. In addition, the first interface module 22 is extended in the form of software based on the existing bus transmission master 21 between the robot controller 1 and the servo drive module 3. The software design greatly reduces the cost and is also more flexible than hardware used in the prior art for increase of transmission speed. Further, a data transfer protocol between the first interface module 22 and the robot controller 1 is set to be the same as a data transfer protocol between the robot controller 1 and the servo drive module 3, thus greatly simplifying the program design and further reducing the cost.

The robot control system includes the robot controller 1 and a plurality of other data processing units, such as the demonstrator 7, the safety unit 4, and the sensor unit. Each data processing unit communicates with the robot controller 1 via the first interface module 22 and/or the second interface module 23. In this embodiment, as shown in FIG. 1, the demonstrator 7 is connected to the safety unit 4, and the demonstrator 7 transmits the safety signal to the robot controller 1 via the safety unit 4. Therefore, only the second interface module 23 is needed for signal transmission between the demonstrator 7 and the robot controller 1. The safety unit 4 outputs the first type of signals B1 such as the safety signal to the robot controller 1 via the first interface module 22, and at the same time, the safety unit also receives a control signal from the robot controller 1 via the second interface module 23.

The safety unit 4 is a microcontroller-based data processing unit. According to an existing data transmission method, all signals between the safety unit and the robot controller 1 are transmitted via the second interface module such as a USB interface or a serial interface, and data transmission may occupy a lot of resources of a microcontroller in the safety unit. In this embodiment, the safety unit 4 transmits the first type of signals B1 based on a slave controller in the first interface module 22, which greatly saves the resources of the microcontroller in the safety unit, and makes the safety unit have more resources for data transmission on the second interface module 23. Since the sensing signal is related to the movement status of the robot in real time, the sensor unit needs to have a high response speed. Thus, the sensor unit performs data transmission with the robot controller via the first interface module 22. However, the present invention does not limit this in any way.

In this embodiment, the robot controller and the servo drive module communicate via the bus transmission master so as to control the movement status of the robot. On the basis of the bus transmission master, the first interface module is extended on the robot controller, and the robot controller inputs or outputs the first type of signals that require high-speed response from the first interface module via the bus, so as to achieve high-speed transmission. At the same time, the robot controller is further provided with a common hardware-based USB interface or serial interface for transmitting the second type of signals that do not require high response, so as to achieve low-speed transmission. The robot data transmission system according to the present invention integrates the high-speed transmission interface and the low-speed transmission interface, and the high-speed transmission or low-speed transmission is selected according to the response requirements of signals during data transmission. Compared with an existing robot control system which merely has a single data transmission interface, the problem about data transmission is well solved due to the combination of the first interface module and the second interface module, and the cost is greatly reduced by using the first interface module for transmission of part of data. Further, as the first interface module 22 is extended with software based on the bus transmission master on the robot controller 1, the design does not require changes to the hardware in the existing robot control system, which not only makes the design more convenient to implement but also significantly reduces the cost.

In this embodiment, as shown in FIG. 3, the safety unit 4, the servo drive module 3, and the bus transmission master 21 in the data transmission module 2 are interconnected. The safety unit 4 and the bus transmission master 21 monitor each other. A first safety circuit 10 is established between the safety unit 4 and the servo drive module 3. A second safety circuit 20 is established between the bus transmission master 21 and the servo drive module 3. A first safety control signal K1 is generated in the first safety circuit 10 to turn off output of the servo drive module 3 in the case that the safety unit 4 receives the abnormal input signal, or monitors that the bus transmission master 21 fails or the safety unit fails. At the same time, a second safety control signal K2 is generated in the second safety circuit 20 to turn off the output of the servo drive module 3 in the case that the bus transmission master 21 receives the abnormal input signal from the safety unit 4, or the bus transmission master fails, or it is monitored that the safety unit 4 fails.

Due to the setting of the first safety circuit 10 and the second safety circuit 20 in a safety logic control system according to this embodiment, dual safety control is provided for the servo drive module 3, and when one of the safety circuits fails, the servo drive module 3 may still obtain a failure or abnormal signal via the other safety circuit, thus ensuring safe operation of the robot. Further, the safety unit 4 and the bus transmission master 21 monitor operation statuses mutually. In the case that the safety unit 4 fails, the bus transmission master 21 may turn off the output of the servo drive module 3 via the second safety circuit 20 based on the failure signal. Similarly, in the case that the bus transmission master 21 fails, the safety unit 4 turns off the output of the servo drive module 3 via the first safety circuit 20 in response to the failure. The safety unit 4 and the bus transmission master 21 form the interlocked safety logic, which greatly improves the safety level of the safety logic control system.

In this embodiment, the servo drive module 3 includes a transmission slave 31 matching the bus transmission master 21. The transmission slave 31 monitors the status of the bus transmission master 21 via the second safety circuit 20. When monitoring that the bus transmission master 21 fails, the transmission slave 31 outputs the second safety control signal K2 to turn off the output of the servo drive module 3. In the case that the bus transmission master 21 is normal, the second safety control signal K2 in the second safety circuit 20 may be output from the bus transmission master 21 to the transmission slave 31. Similarly, the safety unit 4 has the first interface module 22 matching the bus transmission master 21. In the case that the bus transmission master 21 fails, the first interface module 22 outputs the first safety control signal K1 to the servo drive module 3.

In this embodiment, a bus transmission communication network is an EtherCAT network, the bus transmission master 21 is an EtherCAT transmission master, the servo drive module 3 has the matching EtherCAT slave, and the safety unit 4 has the first interface module 22. The EtherCAT transmission master is connected to the safety unit 4 and the servo drive module 3 via the EtherCAT bus. The safety unit 4 transmits a live signal and other fault or abnormal signals with the bus transmission master 21 via the first interface module 22. The servo drive module 3 monitors a live signal of the bus transmission master 21 or receives the second safety control signal from the bus transmission master 21 via the EtherCAT slave. In FIG. 3, a transmission line for the live signal is represented by LS, and a transmission line for an error signal is represented by ES. The live signal refers to a live signal of an application within each module or unit. For example, for the robot controller, the live signal may be a live signal of a demonstrator program; and the safety unit and the bus transmission master monitor live signals of the other party via a built-in application.

In this embodiment, as shown in FIG. 3, the robot controller 1 includes a real-time operation module 11, and the real-time operation module 11 is connected to the bus transmission master 21. In the case that the real-time operation module 11 fails, the bus transmission master 21 turns off the output of the servo drive module 3 via the second safety circuit 20, and at the same time, triggers the safety unit 4 to turn off the servo drive module 3 via the first safety circuit 10.

In this embodiment, the bus transmission master 21 is integrated in the real-time operation module 11 and uses a CPU in the real-time operation module 11 for data processing, so that the bus transmission master and the real-time operation module may monitor statuses mutually via the shared CPU. However, the present invention does not limit this in any way. In other embodiments, the bus transmission master may also be controlled by an independent CPU. In this case, the bus transmission master and the real-time operation module communicate using the transmission lines for live signals and error signals.

In this embodiment, the robot controller 1 further includes a non-real-time operation module 12, such as a windows system. In the case that the non-real-time operation module 12 fails, the real-time operation module 11 acquires a failure signal of the non-real-time operation module 12 and outputs the failure signal to the bus transmission master 21, and the bus transmission master 21 turns off the output of the servo drive module 3 via the first safety circuit 10 and the second safety circuit 20. Further, the non-real-time operation module 12 is connected to the safety unit 4, and the safety unit 4 monitors a status of the non-real-time operation module 12. When detecting a failure of the real-time operation module 11 or the non-real-time operation module 12, the safety unit 4 turns off the output of the servo drive module 3 via the first safety circuit 10. In this way, the two operation modules in the robot controller 1 may output failure signals based on the bus transmission master 21 and the safety unit 4, thus realizing dual protection.

Similarly, the safety unit 4 transmits the abnormal input signal to the non-real-time operation module 12 upon receiving the abnormal input signal, the non-real-time operation module 12 transmits the abnormal input signal to the real-time operation module 11, and the real-time operation module 11 triggers the bus transmission master 21 to output the second safety control signal K2 to turn off the output of the servo drive module 3. In this way, dual protection is also provided for the safety unit 4. In this case, if the connection between the safety unit 4 and the bus transmission master 21 fails, the safety unit 4 may also turn off the servo drive module via the non-real-time operation module 12, the real-time operation module 11, the bus transmission master 21, the second safety circuit 20, and the servo drive module 3.

In this embodiment, the robot controller 1 further has a storage module 13, and the storage module 13 is shared by the real-time operation module 11 and the non-real-time operation module 12. The real-time operation module 11 and the non-real-time operation module 12 acquire live signals of the other party via the shared storage module 13 to monitor statuses of the other party, and at the same time, communicate via the storage module 13. For example, the non-real-time operation module 12 transmits the abnormal input signal to the real-time operation module 11 via the storage module 13 upon receiving the abnormal input signal from the safety unit 4.

In this embodiment, the safety unit 4 is connected to the non-real-time operation module 12 via an RS bus, and monitors a live signal of the non-real-time operation module 12. However, the present invention does not limit this in any way. In other embodiments, the safety unit and the non-real-time operation module may communicate via other buses.

Further, in this embodiment, the main circuit has an AC contactor 8 that controls the on/off of the main circuit. The safety unit 4 is connected to the AC contactor 8, and a third safety circuit 30 is established between the safety unit and the AC contactor 8. The safety unit 4 turns off the output of the servo drive module 3 via the first safety circuit 10, and also outputs a third safety control signal K3 to the AC contactor 8 via the third safety circuit 30 to disconnect input of the main circuit, so as to turn off the servo drive module 3. In the first safety circuit 10 and the second safety circuit 20, the servo drive module 3 is turned off by turning off the output based on the input safety control signals in a software-controlled manner. In the third safety circuit 30, the safety unit 4 controls the AC contactor 8 not only at the input end but also by hardware. In this way, the safety unit 4 may control the AC contactor 8 to achieve forced cutoff at the input end even if the servo drive module 3 fails to respond to the safety control signals input from the first safety circuit 10 and the second safety circuit 20, further increasing the safety level. However, the present invention does not limit this in any way. In other embodiments, the third safety circuit may be not provided in the case that the servo drive module has a self-test function.

The working principle of the robot safety logic control system according to this embodiment will be described in detail below in connection with FIG. 3.

First, in the case that the safety unit 4 receives an emergency stop signal input externally or by the demonstrator: (1) the safety unit 4 outputs the first safety control signal K1 to the servo drive module 3 via the first safety circuit 10 to turn off the output of the servo drive module 3; (2) the safety unit 4 outputs the third safety control signal K3 via the third safety circuit 30 to cut off the AC contactor 8, and the servo drive module 3 is disconnected from the main circuit, with the output thereof turned off correspondingly; (3) the safety unit 4 transmits the failure signal to the bus transmission master 21 via the first interface module 22, and the bus transmission master 21 transmits the failure signal to a real-time control module 41. The real-time control module 41 outputs the second safety control signal K2 to the servo drive module 3 via the bus transmission master 21 and the second safety circuit 20 after processing; and (4) the safety unit 4 transmits the emergency stop signal to the non-real-time operation module 12 via the RS bus, and the non-real-time operation module 12 transmits the emergency stop signal to the real-time operation module 11 via the storage module 13. Based on the received emergency stop signal, the real-time control module 41 triggers the bus transmission master 21 to turn off the servo drive module 3 via the second safety circuit 20. In addition, in the case that the safety unit fails, the bus transmission master 21 and the non-real-time operation module may also turn off the servo drive module 3 via the first safety circuit by monitoring a live signal of the safety unit.

Second, in the case that the bus transmission master 21 crashes: (1) as the first interface module 22 in the safety unit 4 fails to receive a live signal from the bus transmission master 21 within the set time, the first interface module 22 outputs a safety trigger signal, and the safety unit 4 outputs the first safety control signal K1 to the servo drive module 3 via the first safety circuit 10 based on the safety trigger signal, so as to turn off the output of the servo drive module 3; (2) the safety unit 4 outputs the third safety control signal K3 via the third safety circuit 30 to cut off the AC contactor 8, and the servo drive module 3 is disconnected from the main circuit, with the output thereof turned off correspondingly; (3) after the transmission slave 31 in the servo drive module 3 fails to receive a live signal from the bus transmission master 21 within the set time, the second safety control signal K2 is output, and the output of the servo drive module 3 is turned off based on the second safety control signal K2; and (4) the real-time operation module 11 monitors the status of the bus transmission master 21 in real time via the software in the bus transmission master 21, and in response to finding that the bus transmission master 21 crashes, the real-time operation module sends a safety trigger signal to the non-real-time operation module 12 via the storage module 13. The non-real-time operation module 12 outputs the safety trigger signal to the safety unit 4 via the RS bus, and the safety unit 4 turns off the output of the servo drive module 3 via the first safety circuit 10 and the third safety circuit 30 simultaneously.

Third, in the case that the real-time operation module 11 crashes: (1) in this embodiment, as the bus transmission master 21 is integrated in the real-time operation module 11, in the case that the real-time operation module 11 crashes, the first interface module 22 in the safety unit 4 fails to receive a live signal from the bus transmission master 21 within the set time, then the first interface module 22 outputs a safety trigger signal, and the safety unit 4 outputs the first safety control signal K1 to the servo drive module 3 via the first safety circuit 10 based on the trigger signal, so as to turn off the output of the servo drive module 3; (2) the safety unit 4 outputs the third safety control signal K3 via the third safety circuit 30 to cut off the AC contactor 8, and the servo drive module 3 is disconnected from the main circuit, with the output thereof turned off correspondingly; (3) after a diagnostic program of the bus transmission master 21 monitors that the real-time operation module 11 crashes, the second safety control signal K2 is output via the second safety circuit 20 to turn off the output of the servo drive module; and (4) after the non-real-time operation module 12 fails to acquire the live signal from the real-time operation module 11 via the storage module 13, the non-real-time operation module outputs a safety trigger signal to the safety unit 4 via the RS bus, and the safety unit 4 turns off the output of the servo drive module 3 via the first safety circuit 10 and the third safety circuit 30 simultaneously.

Finally, in the case that the non-real-time operation module 12 crashes: (1) the safety unit 4 fails to acquire the live signal of the non-real-time operation module 12 via the RS bus, and the safety unit 4 outputs the first safety control signal K1 to the servo drive module 3 via the first safety circuit 10, so as to turn off the output of the servo drive module 3; (2) the safety unit 4 outputs the third safety control signal K3 via the third safety circuit 30 to cut off the AC contactor 8, and the servo drive module 3 is disconnected from the main circuit, with the output thereof turned off correspondingly; (3) after the real-time operation module 11 fails to acquire the live signal of the non-real-time operation module 12 via the storage module 13, the real-time operation module outputs the second safety control signal K2 to the servo drive module 3 via the bus transmission master 21 and the second safety circuit 20; and (4) after the real-time operation module 11 fails to acquire the live signal of the non-real-time operation module 12 via the storage module 13, the real-time operation module outputs a safety trigger signal to the safety unit 4 via the bus transmission master 21, and the safety unit 4 turns off the output of the servo drive module 3 via the first safety circuit 10 or the third safety circuit 30.

As described above, in the robot control system according to this embodiment, the safety unit 4, the bus transmission master 21, the real-time operation module 11, and the non-real-time operation module 12 monitor each other to form safety interlocking, which greatly improves the safety level of the system; and the reliability is further improved due to the combination of software safety control and hardware safety control. In addition, the robot control system according to this embodiment is developed based on various functional modules in the existing robot control system without adding any hardware device, thus greatly reducing the design cost.

Figure 4:
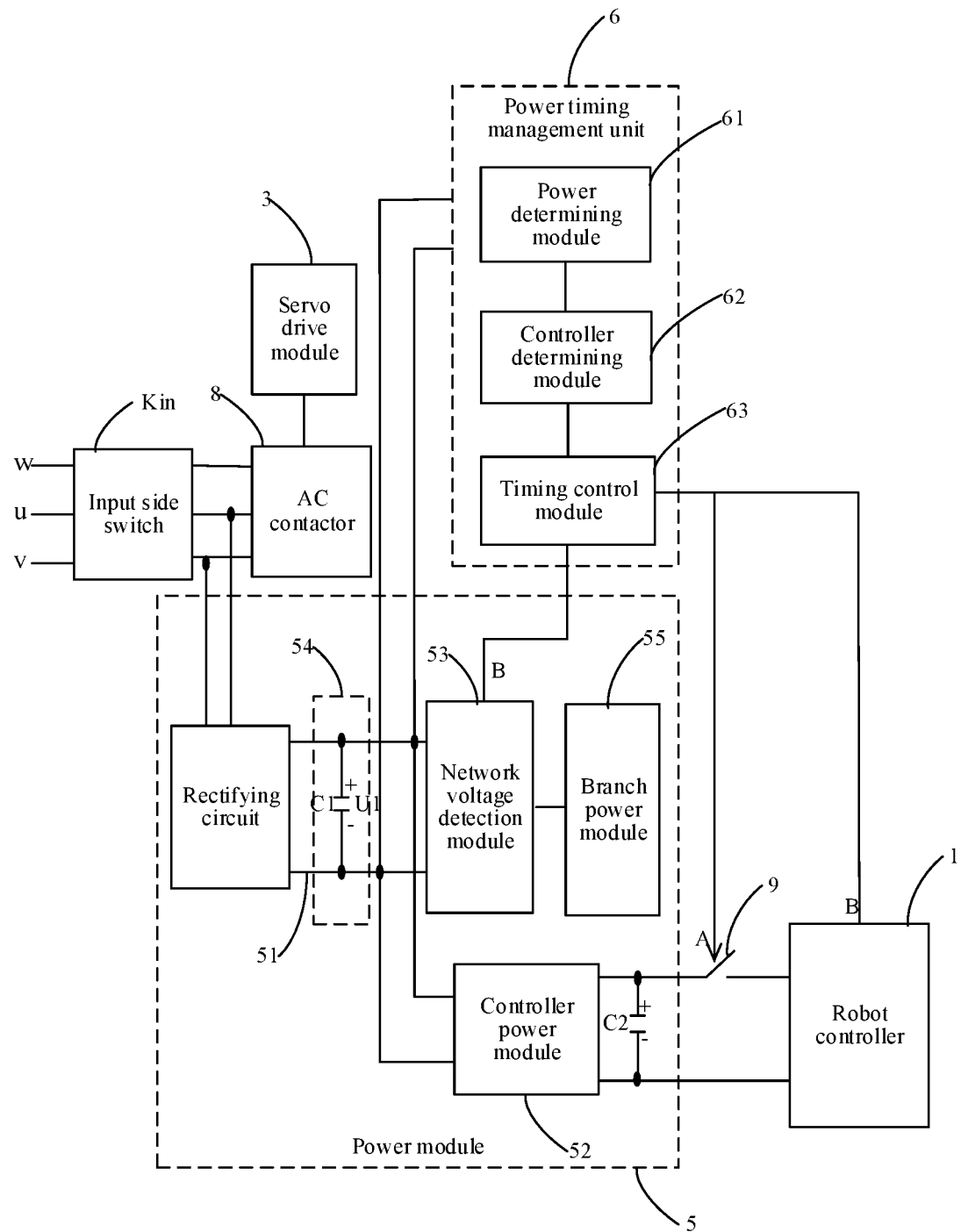
FIG. 4 shows a circuit block diagram of a power module, a power timing management unit, and a robot controller.

In addition, in the case that the main circuit is powered off during robot execution, the real-time operation module 11 and the non-real-time operation module 12 in the robot controller 1 are turned off abnormally, which is extremely likely to cause corruption of data in the two operation modules, and the robot may not be able to continue a current job after restart. To solve this problem, in this embodiment, the power module 5 with a power-off protection function is used to supply power to the robot controller 1. As shown in FIG. 4, the power module 5 includes a power conversion circuit 51, a controller power module 52, a network voltage detection module 53, and an energy storage module 54. The power conversion circuit 51 is connected to the main circuit. The controller power module 52 is connected to the power conversion circuit 51 and supplies power to the robot controller 1. The network voltage detection module 53 is connected to the power conversion circuit 51 to detect an input voltage of the power conversion circuit. In the case that the main circuit is powered off and the input voltage of the power conversion circuit 51 is below a set threshold, the power module 5 outputs a power-off trigger signal to a power timing management unit 6 in the safety unit 4. After the power-off trigger signal is input to the safety unit 4 as an emergency stop signal, the safety unit 4 may disconnect the output of the servo drive module 3 in accordance with the safety logic in FIG. 3, so as to cause the robot to pause.

The energy storage module 54 is connected to the controller power module 52 and stores energy during normal operation of the main circuit. In the case that the main circuit is powered off, the energy storage module 54 outputs energy to maintain normal operation of the controller power module 52, and the controller power module 52 continues to supply power to the robot controller 1 so that the real-time operation module 11 and the non-real-time operation module 12 may complete power-off storage based on the power-off trigger signal. In this embodiment, the energy storage module 54 also supplies power to the safety unit 4 so that the safety unit may operate normally after the main circuit is powered off.

In this embodiment, the energy storage module 54 includes a capacitor C1 connected between a positive bus and a negative bus of the power conversion circuit 51, and the input voltage of the power conversion circuit 51 charges the capacitor C1 via the positive bus and the negative bus during normal power supply. A voltage across the capacitor C1 is U1 after charging. In the case that the input voltage of the power conversion circuit 51 is below the set threshold, the capacitor C1 releases energy to the controller power module 52. The energy stored in the capacitor C1 may continue to maintain the normal operation of the controller power module 52, and the controller power module 52 stops operating until the energy stored in the capacitor C1 is insufficient to maintain the normal operation of the controller power module 52. The capacity of the capacitor C1 determines the operating time of the robot controller 1 for data storage and normal shutdown after the power-off trigger signal B is triggered. Preferably, in this embodiment, the capacity of the capacitor C1 is set to provide the robot controller 1 with a data storage time of 30 seconds, which is longer than normal shutdown time $\Delta T$ of the robot controller. However, the present invention does not limit the structure of the energy storage module in any way. In other embodiments, the energy storage module may also be implemented with other energy storage elements such as inductors.

As shown in FIG. 4, in this embodiment, the power module 5 further includes an output capacitor C2 in crossover connection with an output end of the controller power module 52. The output capacitor C2 stores energy during the normal operation of the power conversion circuit 51. In the case that the input voltage of the power conversion circuit 51 is below the set threshold, the output capacitor C2 discharges, and energy released by the output capacitor C2 is superimposed with the energy output by the capacitor C1 and then output to the robot controller 1. The complementary superposition of the output capacitor C2 on the capacitor C1 during a power failure makes it possible to set the capacity of the capacitor C1 connected to the power conversion circuit 51 to be low, thereby reducing the size of the capacitor C1 and achieving miniaturization of the power conversion circuit 51. However, the present invention does not limit this in any way.

The power conversion circuit 51 is connected to the mains power via an input side switch Kin. The input is AC mains, and the voltage U1 across the capacitor C1 is related to the peak value of the input AC voltage (U1=Uin*1.414, where Uin is an effective value of the input AC voltage). Therefore, the network voltage detection module 53 is set to be connected between the positive bus and the negative bus of the power conversion circuit 51 and located on an output side of the capacitor C1. The network voltage detection module 53 determines an input voltage value by detecting the voltage U1 across the capacitor C1. Specifically, in the case that the effective value of the AC voltage at the input end of the power conversion circuit 51 is below 180 V, that is, the voltage U1 across the capacitor C1 is below 180×1.414=254 V, the network voltage detection module 53 outputs the power-off trigger signal B to the safety unit 4, and the safety unit 4 outputs the power-off trigger signal to the robot controller 1 via a timing control module 63. However, the present invention does not limit this in any way. In other embodiments, the network voltage detection module may also be connected to an input side of the capacitor to directly detect the input voltage of the power conversion circuit.

In this embodiment, circuits of a branch power module 55 and the controller power module 52 are designed based on a PWM control chip of a discrete switching power supply, such as the UC3845 series and the NCP1203 series. The network voltage detection module 53 includes a voltage comparator and a silicon controlled rectifier. A set threshold voltage is input at one end of the voltage comparator, and the other end of the voltage comparator is connected to the two ends of the capacitor C1 to acquire the voltage U1 across the capacitor C1. Output of the voltage comparator is connected to the silicon controlled rectifier. A signal is output to the PWM control chip by controlling the on/off of the silicon controlled rectifier, so as to turn off any output power supply in the branch power module 55. However, the present invention does not limit the specific circuit structure of the branch power module, the controller power module, and the network voltage detection module in any way. In other embodiments, the circuit design of four output power supplies in the branch power module and the controller power module may also be designed based on a chip of an integrated switching power supply, such as the TOP series, LCS series, and LNK series from PI. The network voltage detection module may also be designed based on the chip of the integrated switching power supply, so as to integrate with the branch power module. In this embodiment, the robot controller 1 is an industrial personal computer (IPC). However, the present invention does not limit this in any way.

This embodiment does not limit the way of outputting the power-off trigger signal B. In other embodiments, as shown in FIG. 10A, FIG. 10B and FIG. 11, the network voltage detection module may also output the power-off trigger signal B in other ways.

Figure 10A:
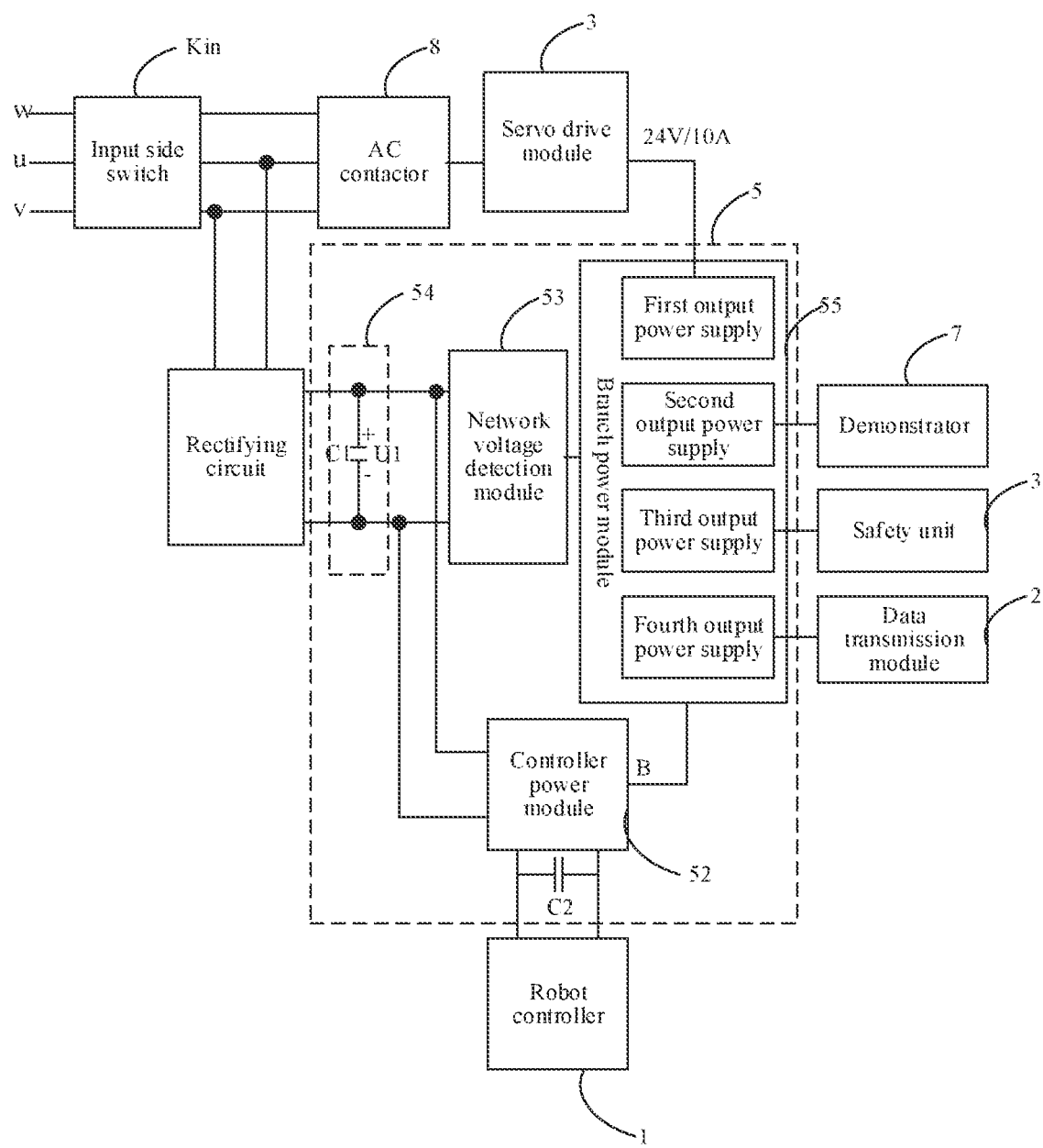
FIG. 10A, FIG. 10B, and FIG. 11 show schematic diagrams of power modules according to other embodiments of the present invention.
Figure 10B:
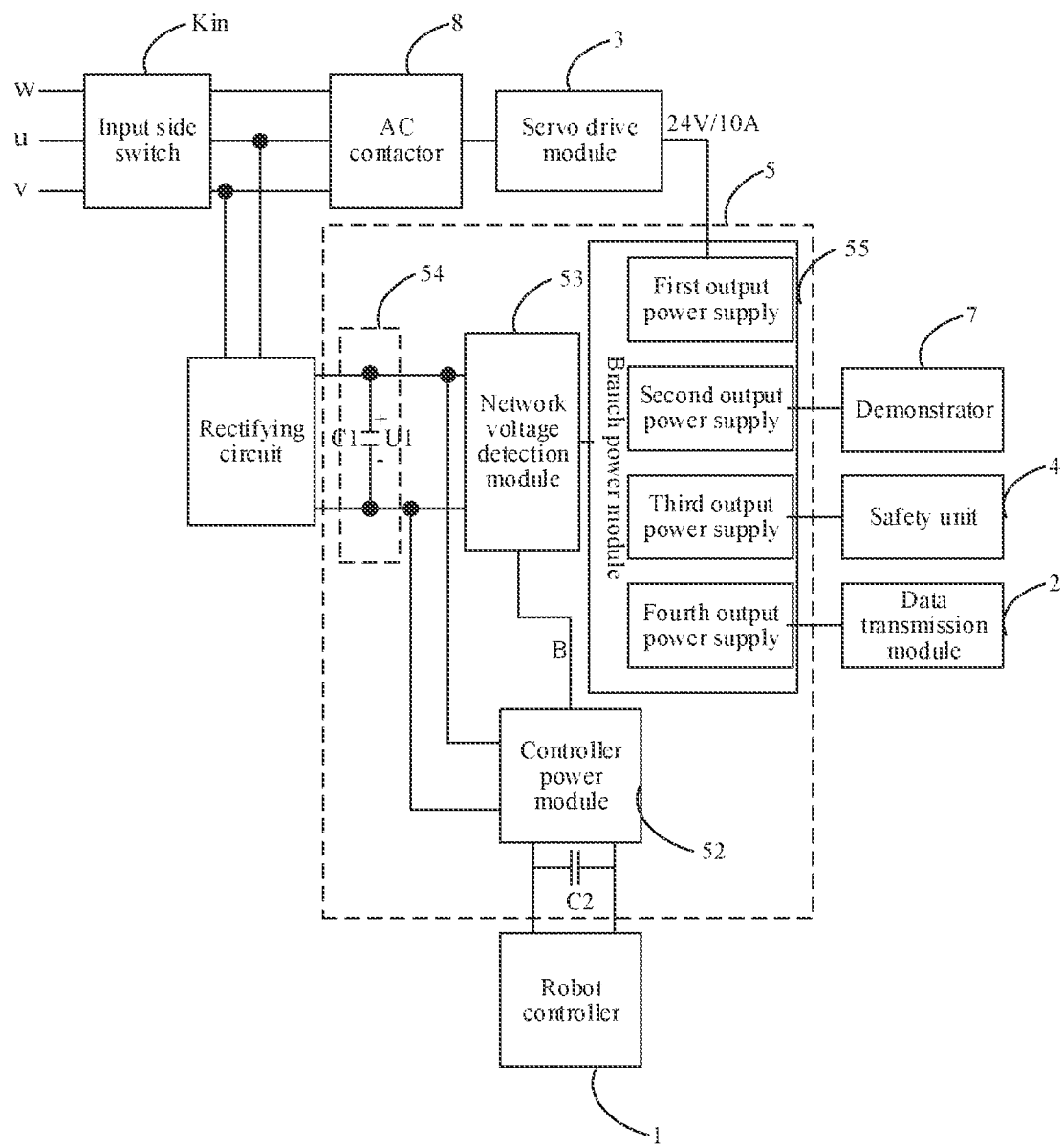
Figure 11:
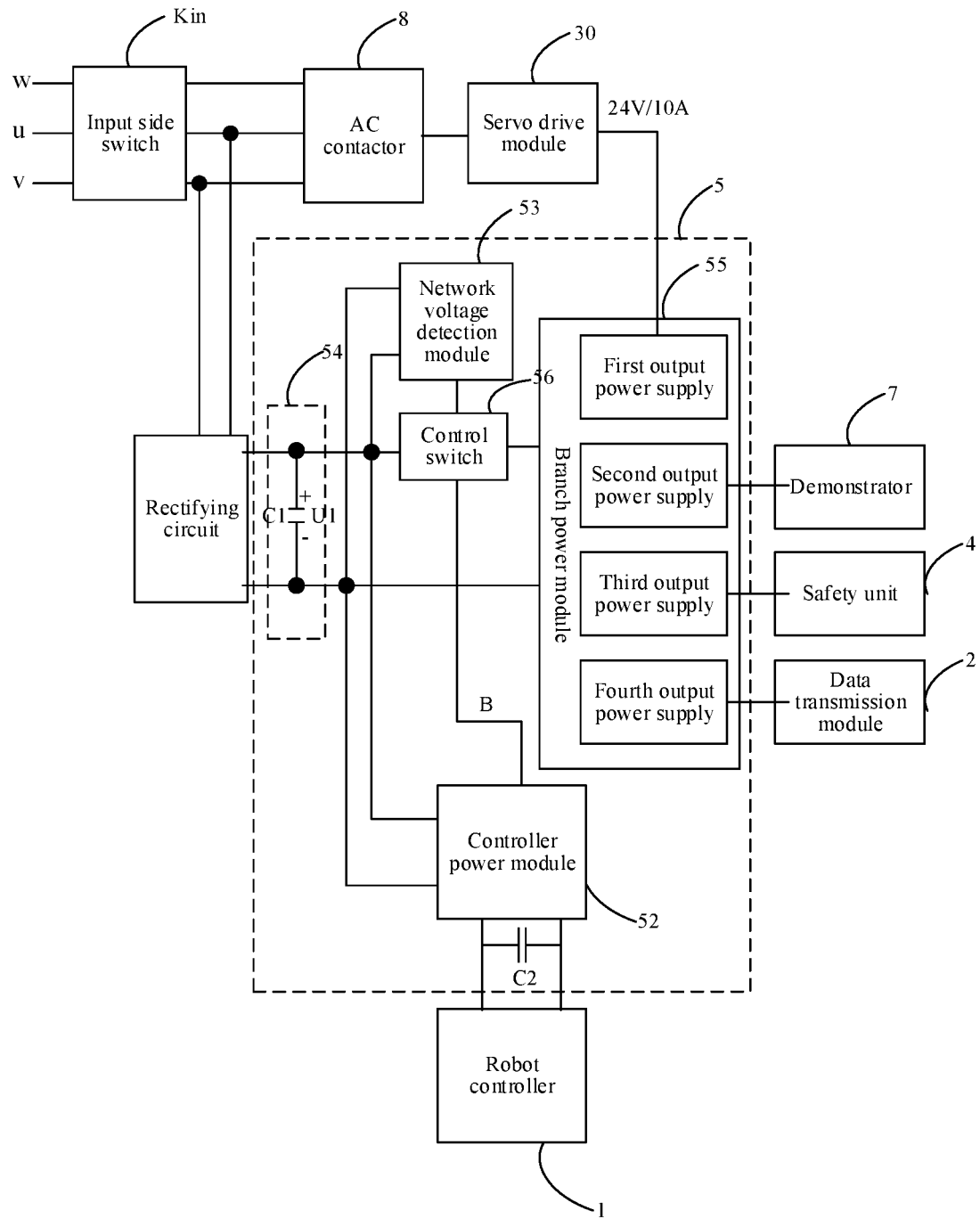

Specifically, as shown in FIG. 10A, the power module further includes the branch power module 55 connected to the output end of the power conversion circuit 51 and connected in parallel with the controller power module 52. The network voltage detection module 53 is connected to the branch power module 55. The branch power module 55 includes the four output power supplies: a first output power supply for the servo drive module 3, a second output power supply for the demonstrator 7, a third output power supply for the safety unit 4, and a fourth output power supply for the data transmission module. In the case that the network voltage detection module 53 detects that the input voltage of the power conversion circuit 51 is below the set threshold, all the four output power supplies in the branch power module 55 are triggered to turn off the output, and the power-off trigger signal B is generated while the four output power supplies are turned off. In this way, shutdown of the four output power supplies and output of the power-off trigger signal B are integrated, which greatly simplifies the circuit structure. However, the present invention does not limit this in any way. In other implementations, as shown in FIG. 10B, the network voltage detection module may also output the power-off trigger signal B directly to the controller power module 52.

In the embodiment shown in FIG. 10A, the branch power module 55 outputs the power-off trigger signal B to the robot controller 1 via the controller power module 52, which simplifies a connection interface between the power module 5 and the robot control 1. However, the present invention does not limit this in any way. In other embodiments, the branch power module or the network voltage detection module may also output the power-off trigger signal B directly to the robot controller. In the embodiment shown in FIG. 10A, the branch power module 55 has a relay switch, and the relay switch may be triggered by turning off the output of all or any one of the four output power supplies. The relay switch outputs a power-off trigger signal B in the form of high/low level to the controller power module. However, the present invention does not limit this in any way. In other embodiments, the power-off trigger signal B may also be an analog signal.

In the embodiment shown in FIG. 10A, the output of the first output power supply is 24 V/10 A; the output of the second output power supply is 12 V/3 A; the output of the third output power supply is 12 V/1 A; the output of the fourth output power supply is 12 V/1 A; and the output of the controller power module is 24 V/3 A. However, the present invention does not limit this in any way.

The present invention does not limit the setting of the network voltage detection module in any way. In other embodiments, as shown in FIG. 11, the network voltage detection module 53 may be independent of the branch power module 55. A control switch 56 is disposed between the power conversion circuit 51 and the branch power module 55, and the control switch 56 is disconnected while the network voltage detection module 53 outputs the power-off trigger signal B. In the case that the input voltage of the power conversion circuit 51 is normal, the control switch 56 is in a closed status, the power conversion circuit 51 supplies power to the branch power module 55 and the controller power module 52, and thus the circuit is in normal operation; at the same time, the capacitor C1 is charged by the input voltage of the power conversion circuit 51. In the case that the input side switch Kin on the main circuit is suddenly opened or the input voltage is unstable to cause the input voltage to be below the set threshold of the network voltage detection module 53, the network voltage detection module 53 outputs a signal to the control switch 56 to disconnect the control switch 56.

In the embodiment shown in FIG. 11, the network voltage detection module 53 outputs the power-off trigger signal B via the control switch 56. Specifically, output of the control switch 56 is connected to the controller power module 52, and the control switch 56 outputs the power-off trigger signal B to the controller power module 52 while the network pressure detection module 53 disconnects the control switch 56. The control switch 56 is a relay switch. However, the present invention does not limit this in any way. In other embodiments, the network voltage detection module may also output the power-off trigger signal B directly to the controller power module. Alternatively, the power-off trigger signal B may be output by the branch power module. Specifically, the control switch cuts off a path between the power conversion circuit and the branch power module, and the output of the output power supplies in the branch power module is turned off. Alternatively, in this case, a relay is connected to the branch power module, and by turning off any one of the output power supplies, the relay outputs the power-off trigger signal B to the controller power module 52.

The power module 5 with the power-off protection function continues to supply power to the robot controller 1 after the main circuit is powered off, so that the real-time operation module 11 and the non-real-time operation module 12 perform power-off storage based on the power-off trigger signal, thus realizing power-off protection. In the power-off protection status, the continuous output of the power module 5 keeps the input end of the robot controller 1 at high level. If the main circuit is powered on again in this status, the level at the input end of the robot controller 1 does not change, the robot controller 1 may maintain off, and accordingly, the two operation modules may not be able to restart. Therefore, once the robot controller 1 is turned off in the power-off protection status, the robot controller may not be able to restart again. In view of this, in this present embodiment, the general-purpose computer-based robot control system provides a power-on timing control method to solve the above problem.

Figure 5:
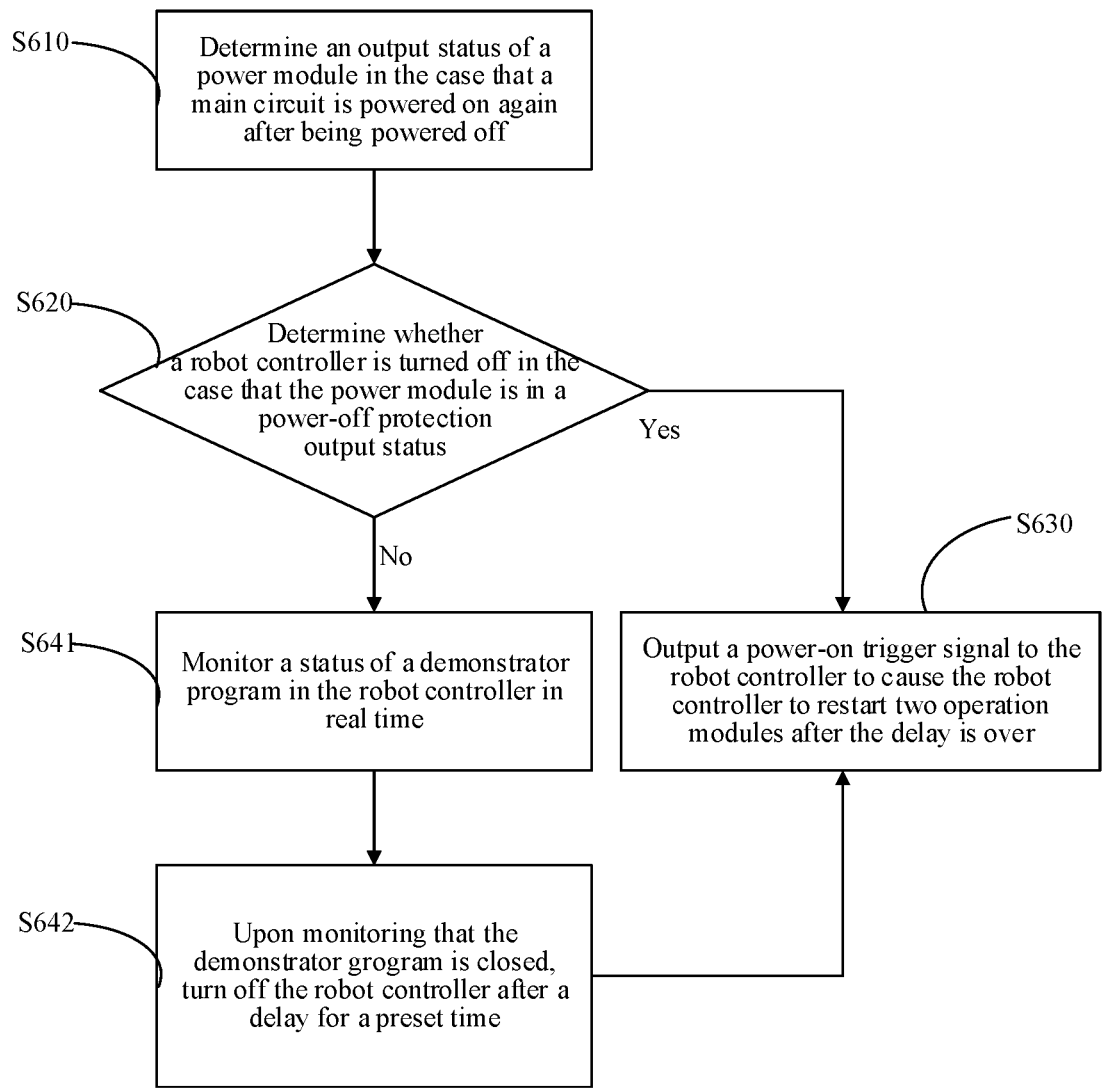
FIG. 5 shows a flow diagram of a timing control method of a power timing management unit in a robot safety logic control system in the case that a main circuit is powered on again in a power-off protection status according to one embodiment of the present invention.

As shown in FIG. 5, the power-on timing control method according to this embodiment includes the following steps: Step S610: Determine an output status of the power module in the case that the main circuit is powered on again after being powered off. Step S620: Determine whether the robot controller is turned off in the case that the power module is in the power-off protection output status. Step S630: If yes, output a power-on trigger signal to the robot controller to cause the robot controller to restart the operation modules. Step S641: If not, monitor a status of a demonstrator program in the robot controller in real time. Step S642: Upon monitoring that the demonstrator program is closed, turn off the robot controller after a delay for a preset time. Step S630: Output the power-on trigger signal to the robot controller to cause the robot controller to restart the operation modules after the delay is over. The power-on timing control method according to this embodiment will be described in detail below in connection with FIG. 7 to FIG. 9.

Figure 7:
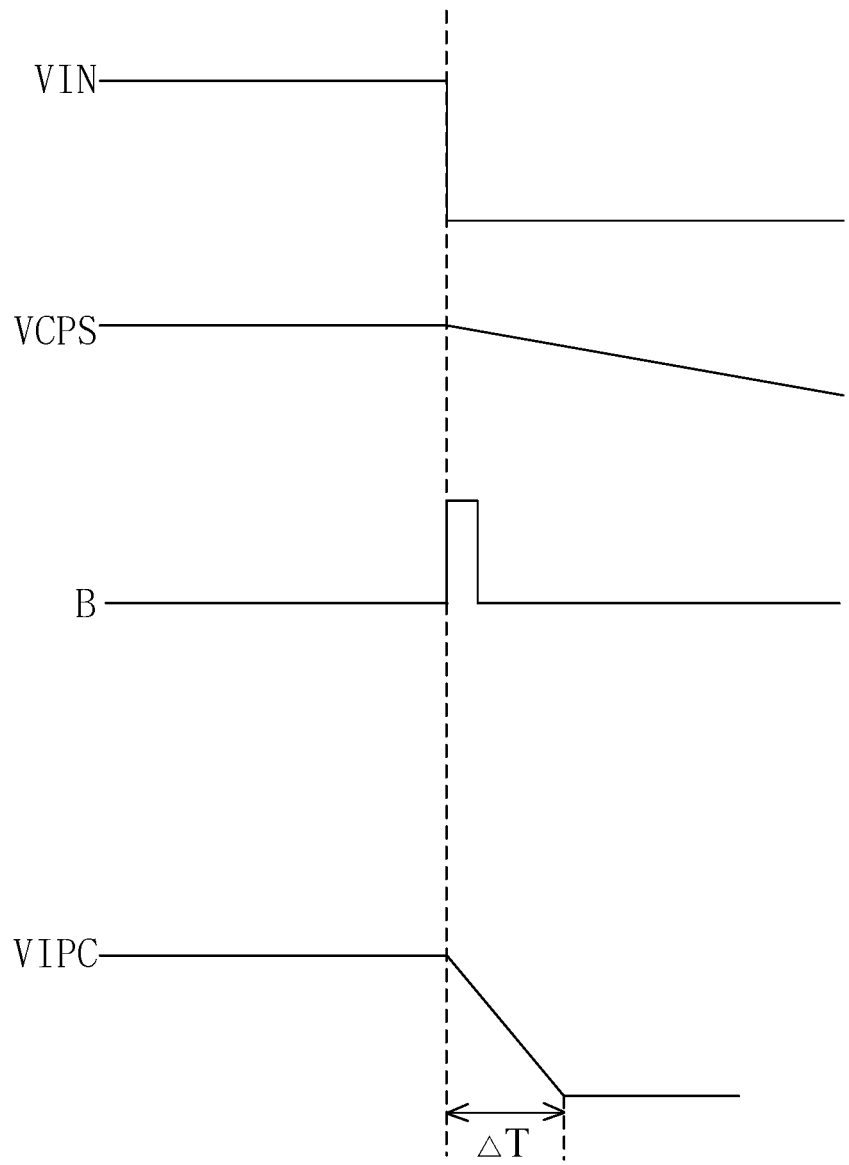
FIG. 7 shows a timing diagram of a main circuit being powered on again in a non-power-off protection status.
Figure 8:
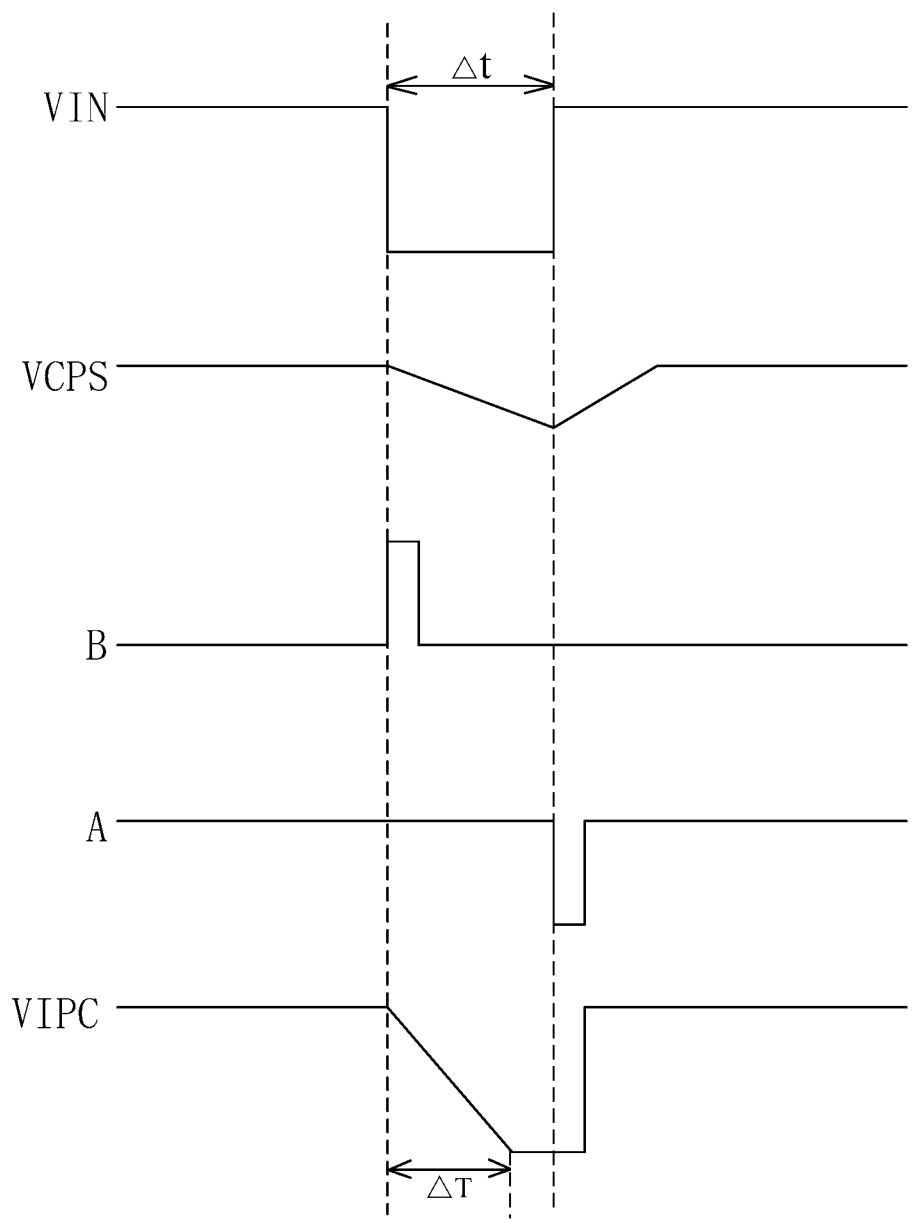
FIG. 8 shows a timing diagram of a main circuit being powered on again in the case that a robot controller is turned off in a power-off protection status.
Figure 9:
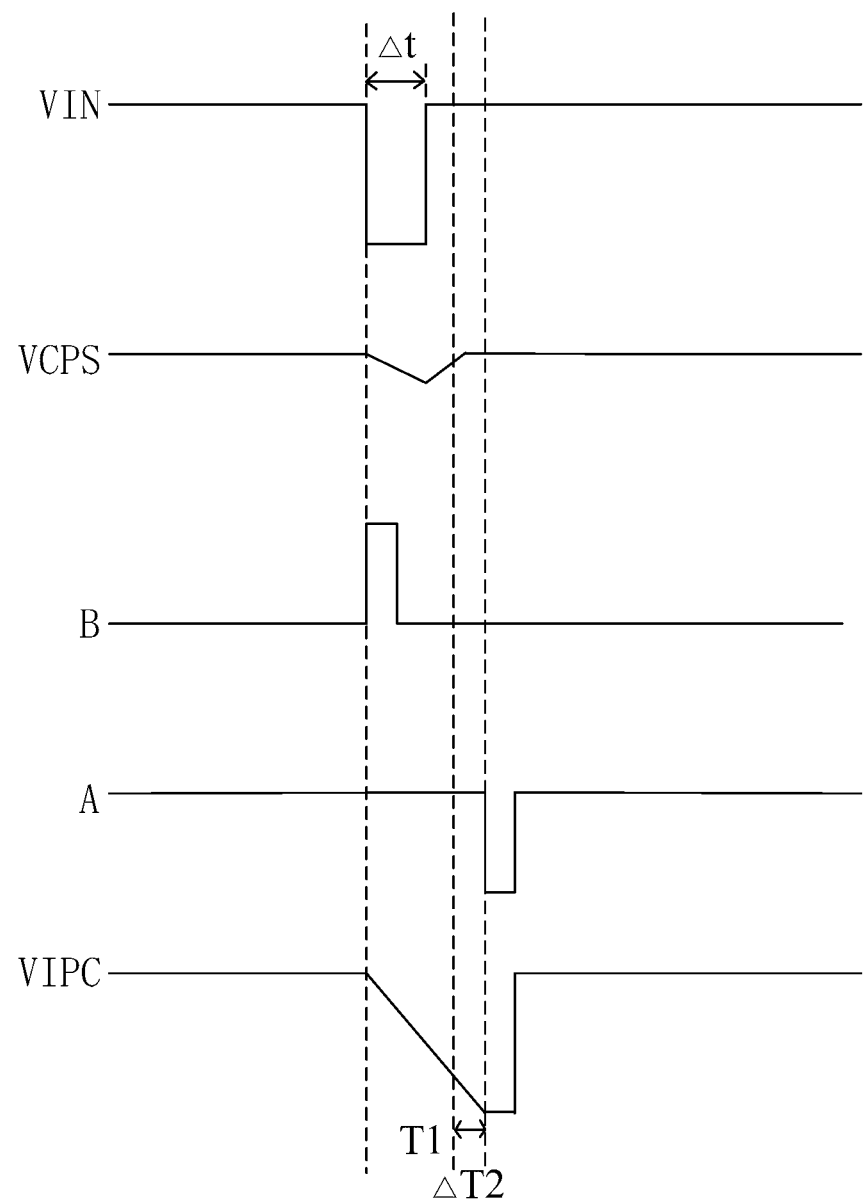
FIG. 9 shows a timing diagram of a main circuit being powered on again in the case that a robot controller is not turned off in a power-off protection status.

The power-on timing control method according to this embodiment starts with step S610, where the output status of the power module 5 is determined in the case that the main circuit is powered on again after being powered off. In the robot control system with the power-off protection function, the power module 5 may switch to the power-off protection output status after the main circuit is powered off, so as to continue to supply power to the robot controller 1 for power-off storage. In the case that the robot controller 1 completes the power-off storage and is turned off and the power module 5 stops supplying power to the robot controller 1, as shown in FIG. 7, the input end VIPC of the robot controller 1 may be at low level and ΔT is normal shutdown time of the robot controller 1. In this case, if the main circuit is powered on again, the power module 5 connected to the main circuit converts the mains power on the main circuit and outputs the mains power to the robot controller 1, and the input end of the robot controller 1 changes from low level to high level. The jump of the level at the input end triggers normal restart of the two operation modules. In this case, the power-on timing control method does not work for this status. The power-on timing control method is applicable to the status where the power module is in the power-off protection output status and the main circuit is powered on again, so that the status of the power module needs to be detected after the main circuit is powered on. In FIG. 7 to FIG. 9, VIN represents an input voltage of the main circuit; VCPS represents an output voltage of the power module; B represents the power-off trigger signal; A represents the power-on trigger signal; and VIPC represents the voltage at the input end of the robot controller 1.

In this embodiment, as shown in FIG. 4, the capacitor C1 is used in the power module 5 to provide power-off protection for the robot controller 1, so that the status of the power module 5 may be determined by detecting the voltage across the capacitor. In the case that the voltage U1 across the capacitor C1 is below the set threshold (which is the minimum voltage to maintain the operation of the robot controller 1), it is considered that the power module 5 is in the power-off protection status. However, the present invention does not limit this in any way. In other embodiments, timing may also be used for determination. Specifically, a time interval between the time when the main circuit is powered on again and the time when the main circuit is powered off last time is calculated, and when the time interval is less than the normal shutdown time ΔT (e.g., 10 seconds) of the robot controller 1, it is determined that the power module is in the power-off protection output status and the robot controller 1 is not turned off. Alternatively, in other embodiments, the status of the power module may also be determined directly by detecting the output of the power module.

Figure 6:
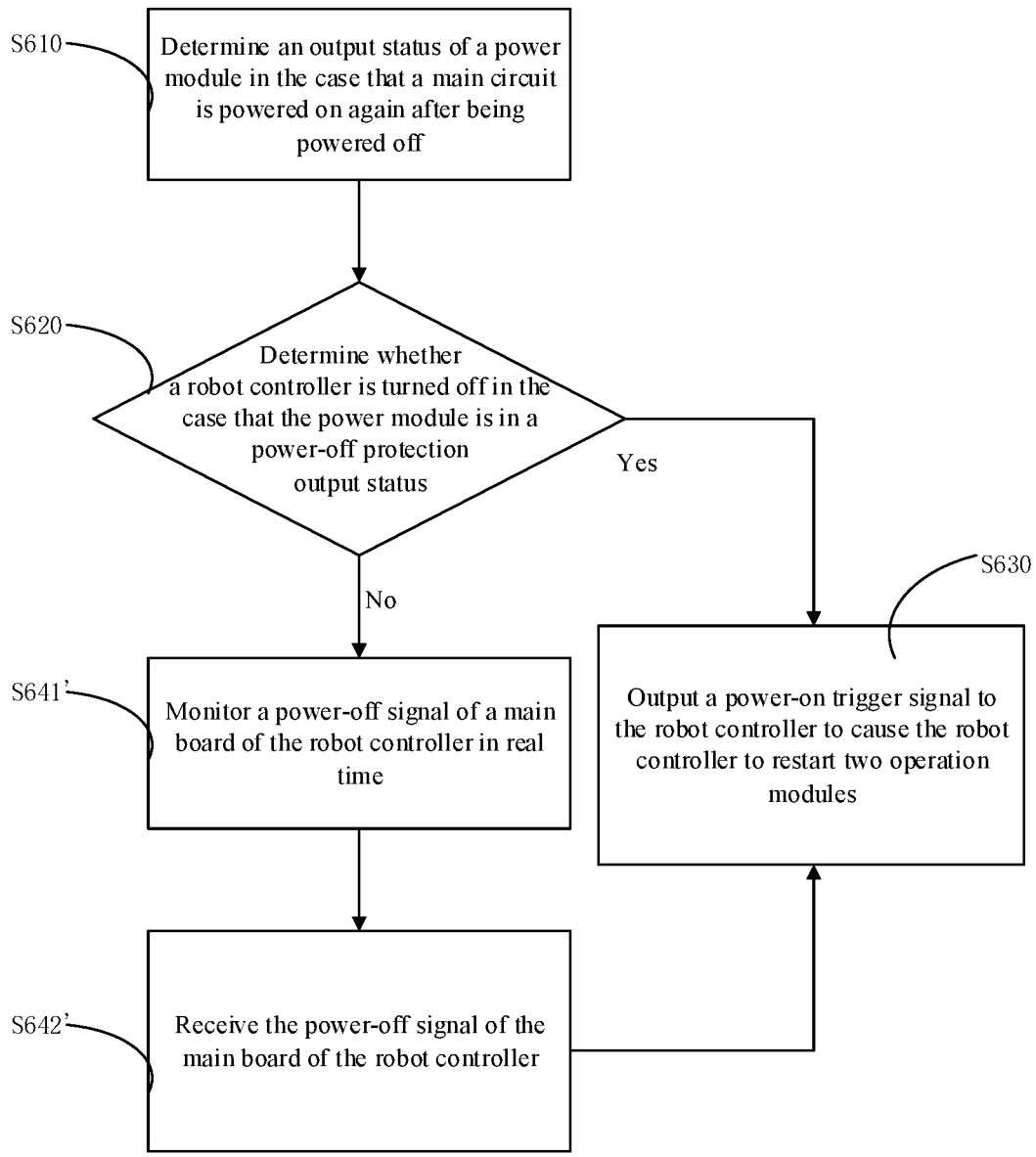
FIG. 6 shows a flow diagram of a timing control method of a power timing management unit in a robot safety logic control system in the case that a main circuit is powered on again in a power-off protection status according to another embodiment of the present invention.

In the case that the main circuit is powered on again and it is detected that the power module 5 is in the power-off protection output status in step S610, step S620 is performed, where whether the robot controller is turned off is determined. If the robot controller is turned off, as shown in FIG. 6, the power timing management unit 6 outputs the power-on trigger signal A to the robot controller 1 to restart the two operation modules (step S630). In this embodiment, the power timing management unit provides a power-on trigger signal A with a rising edge for the input end of the robot controller 1 by opening and then closing the path between the power module 5 and the robot controller 1, and the robot controller 1 restarts the two operation modules based on the rising edge of the power-on trigger signal A. However, the present invention does not limit this in any way. In other embodiments, a forced enable terminal may be provided in the robot controller 1, and the power timing management unit may also output the power-on trigger signal to the forced enable terminal to cause the robot controller 1 to restart the two operation modules in response to the main circuit being powered on again.

To determine the status of the robot controller 1, when the time interval Δt between the time when the main circuit is powered on again and the time when the main circuit is powered off last time is less than the normal shutdown time ΔT (ΔT=T1+ΔT2), for example, 10 seconds, of the robot controller 1, as shown in FIG. 9, it is apparent that the robot controller 1 is still in the power-off storage status and not turned off. If the time interval Δt is greater than or equal to the normal shutdown time ΔT of the robot controller 1, as shown in FIG. 8, the robot controller 1 is normally in the shutdown status. However, in other embodiments, in order to accurately determine the status of the robot controller 1, the power timing management unit may also send a live query signal to the robot controller 1, and if the robot controller 1 fails to return a live signal, it may be determined that the robot controller 1 is turned off. The present invention does not limit this in any way.

In step S620, if it is determined that the robot controller is still in the power-off storage status, step S641 is performed, where the status of the demonstrator program in the robot controller is monitored in real time. Specifically, the power timing management unit 6 sends the live query signal to the robot controller 1 at intervals to determine a live signal output by the demonstrator program in the robot controller 1. When no live signal is received within a preset interval, it is determined that the demonstrator program is closed. For example, the preset time interval is 3 S-5 S, and if no live signal is received from the operation module 5 S after the heartbeat query signal is sent, it is determined that the demonstrator program is closed. However, the present invention does not limit this in any way. Upon determining that the demonstrator program is closed at T1, step S642 is performed, where the robot controller is turned off after a delay for a preset time ΔT2. A timing diagram is as shown in FIG. 9. After the delay is over and it is determined that the robot controller is turned off, the power-on trigger signal A is output to the robot controller to cause the robot controller to restart the operation modules (step S630).

In this embodiment, the robot timing control method achieves normal start of the operation modules in the robot controller in the case that the main circuit is powered on again in the power-off protection output status of the power module, ensuring safe and stable operation of the robot controller 1. In this embodiment, in the case that the power module is in the power-off protection output status and the robot controller is turned off, the time when the robot controller completes power-off storage and is turned off is determined by monitoring the live signal of the demonstrator program in the robot controller and combining with the time delay. This method uses a purely software-based approach to detect the shutdown status of the robot controller without changing any hardware in the existing robot control system, making the design very convenient.

However, the present invention does not limit this in any way. In other embodiments, as shown in FIG. 6, when the main circuit is powered on again after being powered off, the output status of the power module is determined. In the case that the power module 5 is in the power-off protection output status and the robot controller 1 is turned off: step S641': detect a power-off signal of a main board of the robot controller; step S642': receive the power-off signal of the main board of the robot controller; and step S630: output the power-on trigger signal to the robot controller to cause the robot controller to restart the operation modules.

In this embodiment, FIG. 7 to FIG. 9 also show circuit timing diagrams after the main circuit is powered off. According to the power-on timing control method, in the case that the main circuit is powered off, the power module 5 enters the power-off protection output status and outputs the power-off trigger signal B. The robot controller 1 performs power-off storage under the action of the power-off trigger signal B. The output voltage VCPS (voltage across the capacitor) of the power module starts to decrease gradually; and accordingly, the input voltage VIPC of the robot controller 1 decreases gradually.

Corresponding to the above power-on timing control method, the power timing management unit 6 includes a power determining module 61, a controller determining module 62, and the timing control module 63. The power determining module 61 determines the output status of the power module 5 in the case that the main circuit is powered on again after being powered off. In the case that the power module 5 is in the power-off protection output status, the controller determining module 62 determines whether the robot controller 1 is turned off. In the case that the robot controller 1 is turned off, the timing control module 63 outputs the power-on trigger signal to the robot controller 1 to cause the robot controller to restart the two operation modules. When the robot controller 1 is still not turned off, the timing control module 63 monitors the status of the demonstrator program in the robot controller in real time, and turns off the robot controller 1 after a delay for a preset time ΔT2 upon monitoring that the demonstrator program is closed at T1, where T1+ΔT2≈ΔT. The timing control module 63 outputs the power-on trigger signal to the robot controller 1 after the delay is over to cause the robot controller to restart the two operation modules.

The power timing management unit 6 according to this embodiment works as steps S610 to S642 in the above power-on timing control method, which will thus not be repeated here.

In this embodiment, a control switch 9 is disposed between the power module 5 and the robot controller 1, and the timing control module 63 outputs a signal to the robot control switch 9 to cut off the input of the robot controller 1, and then the robot control switch 9 is quickly closed. By quickly disconnecting and then closing the robot control switch 9, the power-on trigger signal A that has the rising edge and may be recognized by the two operation modules is formed at the input end of the robot controller 1. The two operation modules start normally based on the power-on trigger signal A. However, the present invention does not limit this in any way. In other embodiments, the robot controller 1 may also be provided with a forced enable terminal independent of the input end, and the power timing management unit outputs the power-on trigger signal to the forced enable terminal to start the two operation modules.

In this embodiment, the power determining module 61 is a comparator connected to the capacitor C1, and the power determining module 61 determines the status of the power module 5 by detecting the voltage U1 across the capacitor C1. When the voltage U1 across the capacitor C1 is below the set threshold (which is the minimum voltage to maintain the operation of the robot controller 1), it is considered that the power module is in the power-off protection status. The controller determining module 62 is a timer. When the time interval Δt between the time when the main circuit is powered on again and the time when the main circuit is powered off last time is less than the normal shutdown time ΔT (e.g., 10 seconds) of the robot controller 1, it is apparent that the robot controller 1 is still in the power-off storage status and not turned off. If the time interval Δt is greater than or equal to the normal shutdown time ΔT of the robot controller 1, the robot controller 1 is normally in the shutdown status. In this case, in order to accurately determine the status of the robot controller 1, the timing control module 63 monitors and determines the live signal of the demonstrator program in the robot controller 1 at intervals. When no live signal is received within the preset interval time, it is determined that the two operation modules are closed. However, the present invention does not limit this in any way.

In this embodiment, the power timing management unit 6 is integrated into the safety unit 4, and the timing control module 63 uses the CPU in the safety unit to determine the robot status, control the timing, and output the power-on trigger signal in the form of a software program. However, the present invention does not limit this in any way. In other embodiments, the power timing management unit may also be designed with a separate CPU. The power module 5 with the power-off protection function and the power timing management unit 6 realize the safe storage of data and normal restart of the robot controller 1 under an abnormal power failure, further improving the safety of the system.

Figure 14:
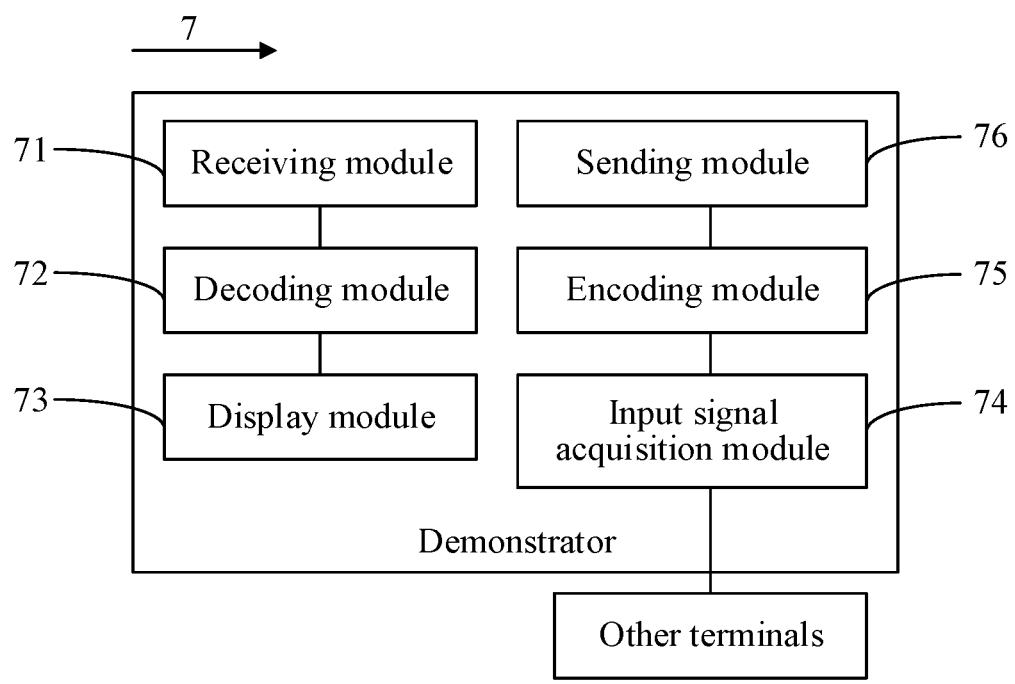
FIG. 14 shows a block diagram of a demonstrator according to an embodiment of the present invention.

In this embodiment, as shown in FIG. 14, the demonstrator 7 includes a receiving module 71, a decoding module 72, a display module 73, an input signal acquisition module 74, an encoding module 75, and a sending module 76. The receiving module 71 receives the terminal video signal and the first control interaction signal from the robot controller. The decoding module 72 is electrically connected to the receiving module 71 and outputs the terminal video signal and the first control interaction signal output from the receiving module 71 to the display module 73 after decoding processing. The display module 73 displays the decoded terminal video signal on the demonstrator, and in response to the received first control interaction signal, displays information of the first control interaction signal in a corresponding display region on the demonstrator. The input signal acquisition module 74 acquires a signal input by a panel of the demonstrator or a signal input from other terminals, and forms the second control interaction signal. The sending module 76 sends the second control interaction signal to the robot controller 1 to control the operation of the robot controller 1.

As shown in FIG. 14, the data transmission between the demonstrator 7 and the robot controller 1 includes the steps: Step S710: Receive the terminal video signal and the first control interaction signal from the robot controller 1 by the receiving module 71. The first control interaction signal includes the operation status of the robot or the operation status of the robot controller. Step S730: Display the received terminal video signal on the demonstrator by the display module 73, and in response to the received first control interaction signal, display information of the first control interaction signal in the corresponding display region on the demonstrator. Step S740: Acquire the signal input by the panel of the demonstrator and convert the signal into the second control interaction signal by the input signal acquisition module 74. Step S760: Send the second control interaction signal to the robot controller to control the operation of the robot controller by the sending module 76. The specific principles of a signal transmission method of the demonstrator according to this embodiment will be described in detail below in connection with FIG. 12 and FIG. 13.

In this embodiment, two-way data transmission is realized between the demonstrator 7 and the robot controller 1. For the convenience of description, the execution steps for signal processing will be described below in the form of numbers. Steps S710 to S730 correspond to the execution steps after the demonstrator 7 receives the signals from the robot controller 1 in FIG. 12, and steps S740 to S770 correspond to the execution steps of the demonstrator 7 sending the signal to the robot controller 1 in FIG. 13. During actual execution, the demonstrator 7 performs signal sending and receiving synchronously.

Figure 12:
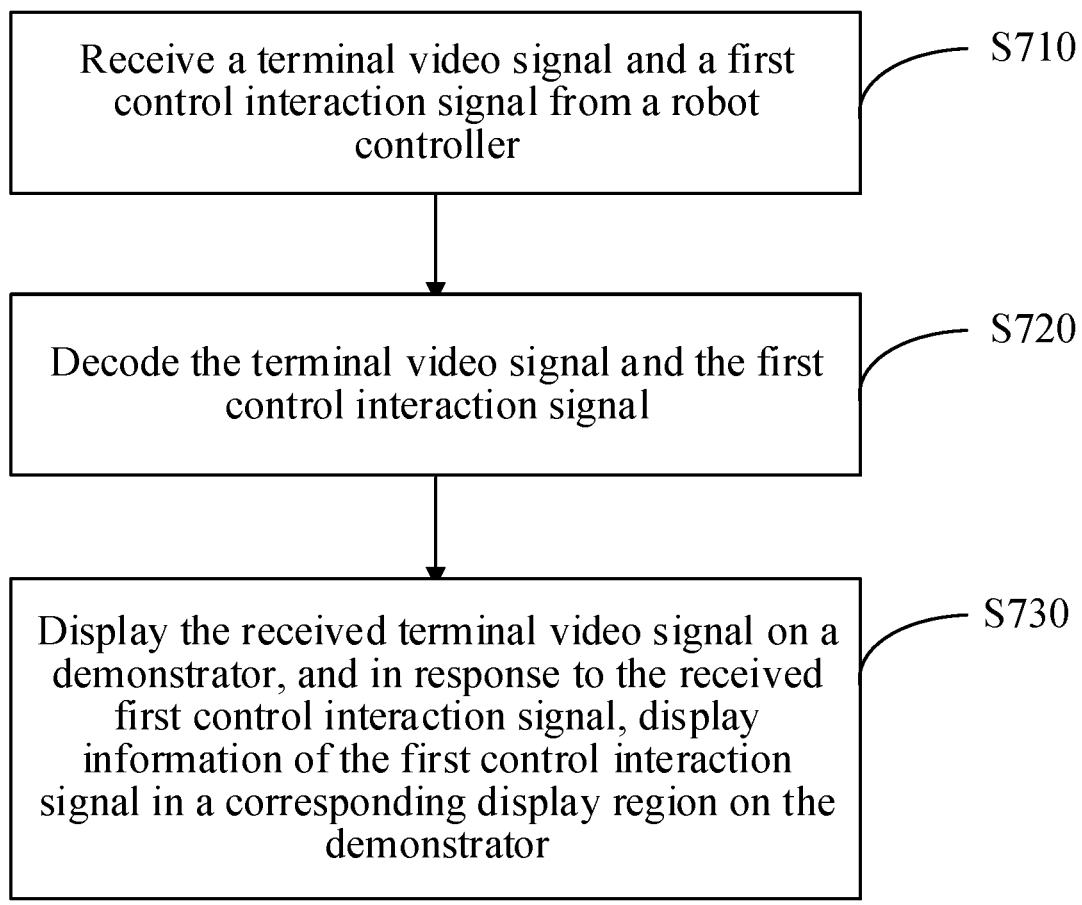
FIG. 12 shows a flow diagram after a demonstrator receives a signal from a robot controller during communication between the demonstrator and the robot controller in FIG. 1.
Figure 13:
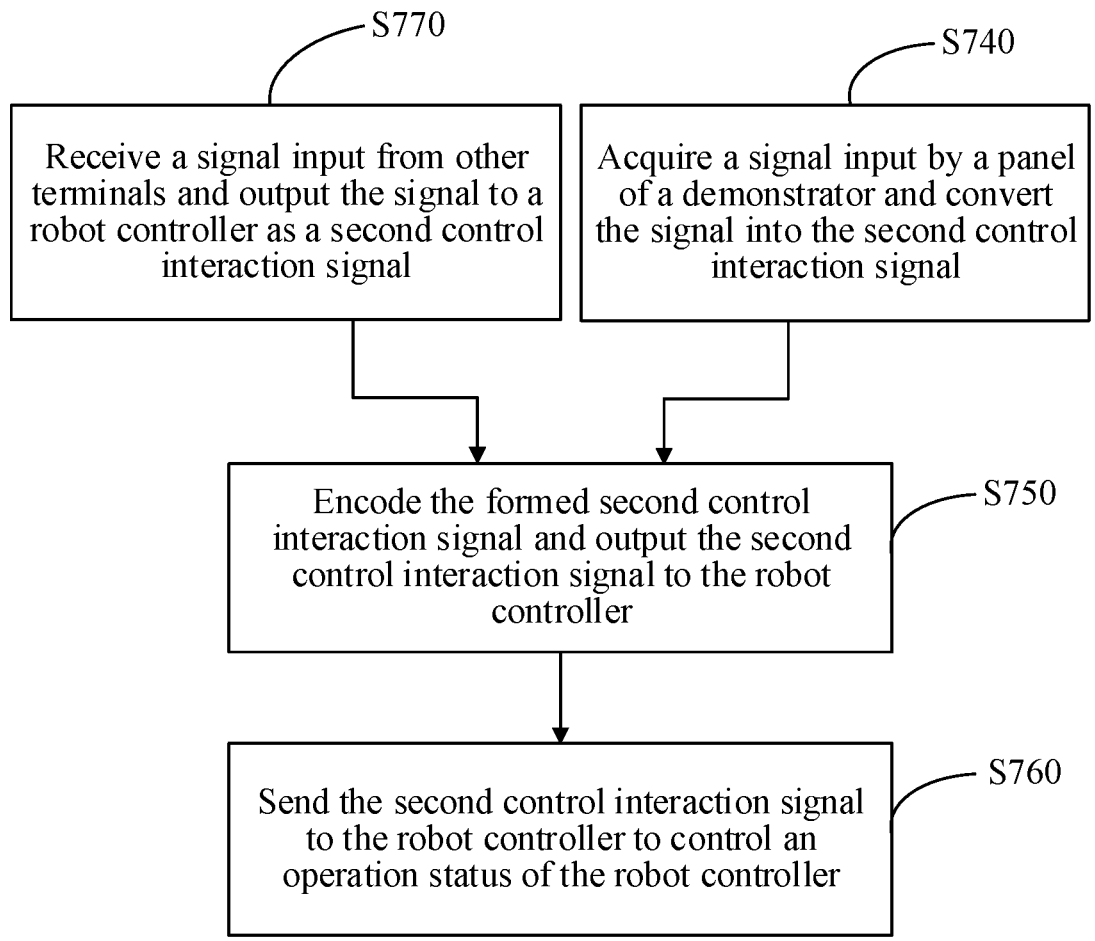
FIG. 13 shows a flow diagram of a demonstrator sending a signal to a robot controller during communication between the demonstrator and the robot controller in FIG. 1.

As shown in FIG. 12, in step S710, the demonstrator 7 receives the terminal video signal and the first control interaction signal from the robot controller 1. The terminal video signal is a real-time video image of the operation status of the robot collected by the robot controller 1, and in this embodiment, the video signal also includes audio. The first control interaction signal includes a current operation status of the robot and a current operation status of the robot controller 1. The current operation status of the robot includes position parameters, movement parameters, etc. of the robot. The current operation status of the robot controller 1 includes the execution progress of the demonstrator program, the operation parameters of the robot controller 1, etc. However, the present invention does not limit this in any way. In other embodiments, the first control interaction signal may also include merely the current operation status of the robot or the current operation status of the robot controller 1.

In this embodiment, the terminal video signal and the first control interaction signal are communicated between the demonstrator 7 and the robot controller 1 by using two different data transmission methods. Specifically, the first control interaction signal, as the first type of data transmission signal, is a USB signal, and the terminal video signal, as the second type of data transmission signal, is an HDMI signal. The HDMI signal has high anti-interference capabilities while achieving transmission of high-definition video images. However, the present invention does not limit this in any way. In other embodiments, the terminal video signal may also be transmitted by a VGA signal.

Further, in this embodiment, the terminal video signal and the first control interaction signal are transmitted in the form of differential. The differential transmission method has high anti-interference capabilities and signal transmission stability, and may achieve long-distance transmission. In the case of differential data transmission, the terminal video signal and the first control interaction signal may be encoded at the robot controller 1 to meet the transmission protocol and then output to the demonstrator 7. Therefore, after the demonstrator 7 receives the terminal video signal and the first control interaction signal (step S710), step S720 is performed, where the decoding module 72 decodes the terminal video signal and the first control interaction signal.

After decoding, step S730 is performed, where the terminal video signal and the first control interaction signal are displayed on the demonstrator 7. The terminal video signal, after being decoded, is directly displayed on a display of the demonstrator 7. The first control interaction signal, after being decoded, may be displayed in the corresponding region of the demonstrator 7 by using a preset display method according to specific information of the first control interaction signal. Specifically, in the case that the first control interaction signal includes specific numerical information, such as the movement speed, of the robot, the information may be superimposed on the video image and displayed on the display as text. In the case that the first control interaction signal includes status indication information, such as a special position (e.g., a home position of the robot) or special action (e.g., a limit action position) of the robot, the information may be superimposed on the video image and flashed on the display as a pattern. In addition, the status indication information may also be displayed by an indicator light on the panel of the demonstrator 7.

The transmission and display of the first control interaction signal enable feedback of the operation status information from the robot controller 1 to the demonstrator, and an operator can directly check the operation status of the robot or the robot controller 1 through the demonstrator 7, which is very convenient and more conducive to real-time control of the robot.

In this embodiment, the signal transmission between the robot controller 1 and the demonstrator 7 is two-way transmission. The signal transmission method of the demonstrator 7 as a signal sending side includes step S740: Acquire the signal input by the panel of the demonstrator 7 and convert the signal into the second control interaction signal. Step S760: Send the second control interaction signal to the robot controller 1. The operator may input a signal through the panel of the demonstrator 7 to control the operation of the robot controller 1. The signal may be input through the panel of the demonstrator 7 via buttons on the panel of the demonstrator 7 and touch buttons on the display. In this embodiment, the second control interaction signal is also a USB signal, and is also transmitted to the robot controller 1 in the form of differential. Therefore, in this embodiment, the signal transmission method of the demonstrator 7 further includes step S750: Encode the formed second control interaction signal, and then perform step S760. Similarly, the robot controller 1 performs decoding correspondingly when receiving the signal input from the demonstrator 7.

In this embodiment, the data transmission method between the demonstrator 7 and the robot controller 1 further includes step S770: Receive the signal input from other terminals and output the signal to the robot controller 1 as the second control interaction signal. For example, the demonstrator 7 has a USB interface, other terminals may be connected to the demonstrator 7 via the USB interface and input a USB signal to the demonstrator 7, and the demonstrator 7 outputs the USB signal to the robot controller 1 as the second control interaction signal by steps S750 and S760, thus realizing remote control by a third party. However, the present invention does not limit this in any way. In other embodiments, in the case that other terminals input non-USB signals to the demonstrator 7, the input signal acquisition module needs to convert the input signals to USB type second control interaction signals.

In this embodiment, the robot controller 1 and the demonstrator 7 transmit the terminal video signal as the HDMI signal, and no separate CPU needs to be provided in the demonstrator 7, so that the cost of the demonstrator 7 is greatly reduced. The long-distance communication between the robot controller and the demonstrator is realized through the differential data transmission method. The operation status of the robot and the operation status of the robot controller 1 on the demonstrator 7 may be checked in real time through transmission of the first control interaction signal, which further expands the functionality of the demonstrator 7.

Figure 15:
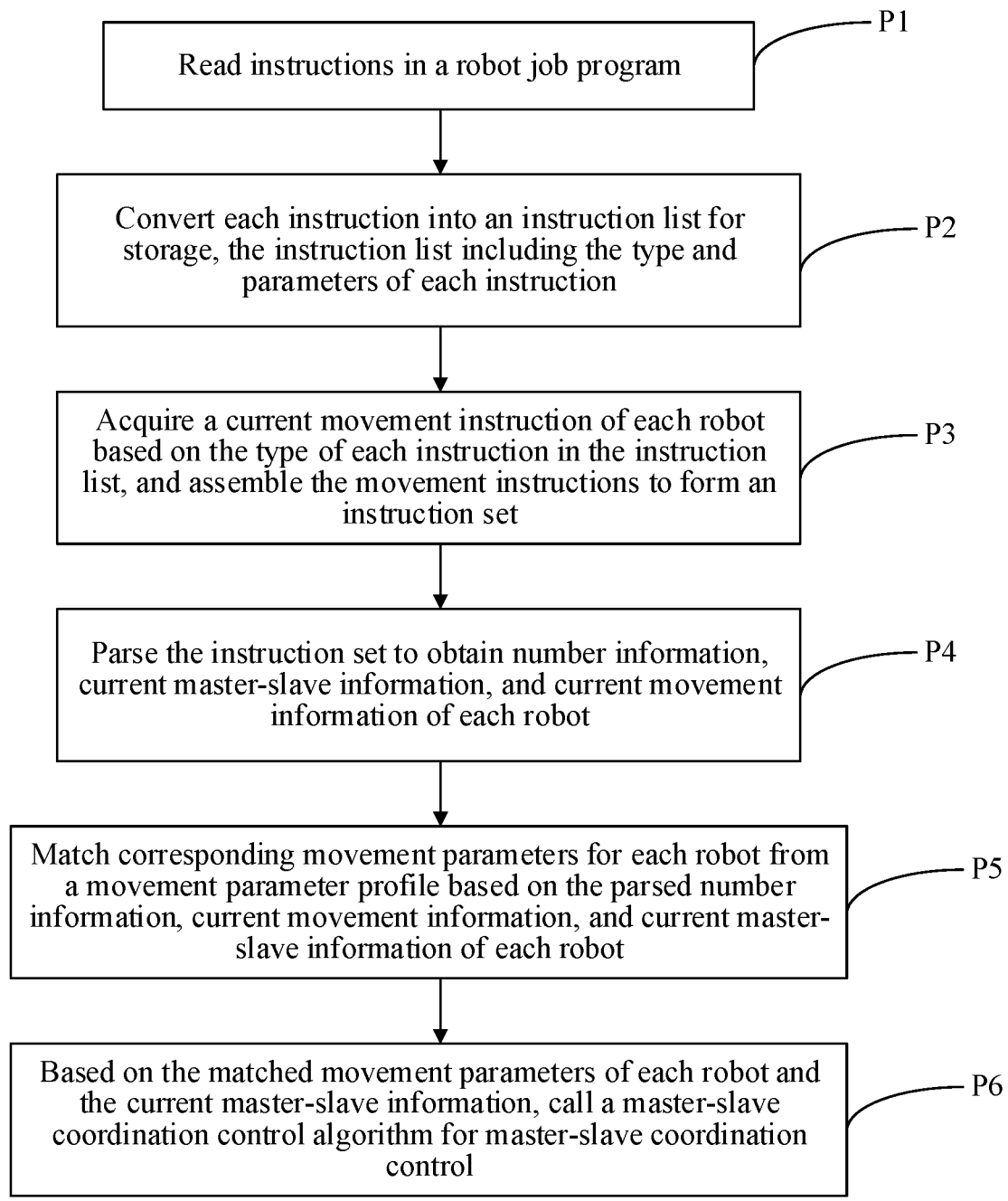
FIG. 15 shows a flow diagram of a master-slave coordination-based robot control method.

Multi-robot cooperation control generally exists among robot control systems. In an existing multi-robot control system, the master-slave relationship of each robot in an execution task is unchangeable. Such control method where the master-slave relationship is unchangeable limits the functionality of each robot to a great extent. In view of this, as shown in FIG. 15, the robot controller 1 controls the servo drive module 3 by using a master-slave coordination-based robot control method. The master-slave coordination-based robot control method includes: step P1: Read instructions in a robot job program. Step P4: Parse the read instructions to obtain number information of each robot, current movement information, and set current master-slave information representing the master-slave relationship of each robot. Step P5: Match corresponding movement parameters for each robot from a movement parameter profile based on the parsed number information, current movement information, and current master-slave information of each robot. Step P6: Based on the matched movement parameters of each robot and the current master-slave information, call a master-slave coordination control algorithm for master-slave coordination control.

In the master-slave coordination-based robot control method according to this embodiment, the current master-slave information representing the master-slave relationship of each robot parsed in step P4 is obtained from the robot job program read in step P1. In this way, the user can set the master-slave relationship of each robot via the robot job program. Furthermore, since the robot job program defines the actions of the robots at each moment in term of timing according to the order of execution of the instructions, and the control method of obtaining the master-slave information based on the job program instructions allows the master-slave information of the robots to change with the timing of tasks, flexible change of the master-slave relationship of each robot in different task phases is achieved.

The master-slave coordination-based robot control method according to this embodiment starts with step P1, where the instructions in the job program are read. Specifically, after the instructions are read, step P2 is performed, where each instruction is converted into an instruction list for storage. The instruction list includes the type and parameters of each instruction.

In master-slave coordination control, the movement trajectory of the slaves changes with the movement trajectory of the master. Therefore, the movement status and master-slave relationship of each robot are closely related, and the combination of the two determines the final movement trajectory of the robot. As a result, in this embodiment, the current master-slave information of each robot is integrated into the movement instructions of the robot, so that the master-slave relationship of each robot is changeable in each movement status, and in term of user operations, the user can determine the master-slave relationship of the current robot based on each instruction, which is very convenient. However, the present invention does not limit this in any way. In other embodiments, the master-slave relationship of a robot may be changed periodically according to the needs of a task. In this case, the master-slave information change may be set in a separate instruction rather than integrated into each movement instruction. Specifically, in this embodiment, the movement instructions include the number information, current master-slave information, and current movement information of each robot.

After converting the instructions into the instruction list, step P3 is performed, that is, current movement instructions for each robot are acquired based on the type of each instruction in the instruction list, and assembled into an instruction set.

Step P4 is then performed, that is, the instruction set is parsed to obtain the number information, current master-slave information, and current movement information of each robot. Due to assembly of the instruction set, each status is parsed only once in step P4, which greatly reduces the amount of program execution. However, the present invention does not limit this in any way. In other embodiments, each instruction may be parsed independently to obtain corresponding information of each movement instruction upon completion of reading, conversion and determination of instruction types.

Step P5 is then performed, where the corresponding movement parameters in the movement parameter profile are matched according to the number information, current master-slave information and current movement information of each robot. In this embodiment, the movement parameter profile includes merely calibration position matrix parameters of pair-wise combination relationships of all the robots. Step P6 is then performed, where the master-slave coordination control algorithm is called based on the master-slave relationship and movement parameters of each robot to form movement instructions, and the movement instructions are output to a plurality of servo drive modules 3, thus realizing master-slave coordination control of the plurality of robots. The master-slave coordination control algorithm may be controlled with an existing control algorithm, and this embodiment does not limit this in any way.

Figure 16:
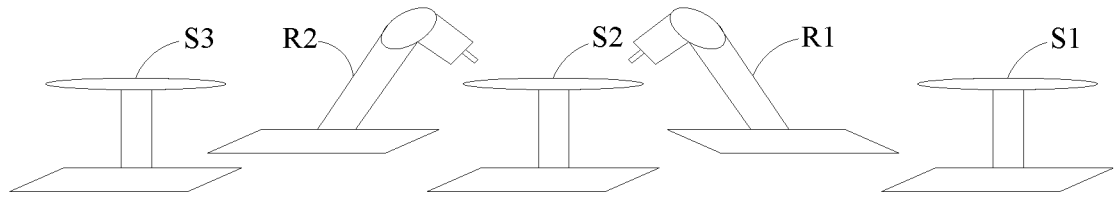
FIG. 16 shows a schematic diagram of the distribution of a plurality of robots in the existing multi-robot coordination control in the field of welding.

FIG. 16 shows a schematic distribution diagram of a plurality of robots in an existing multi-robot coordination control system in the field of welding, and the following program is an example job program to control coordination operation of the plurality of robots shown in FIG. 16. The change principle of the master-slave relationship in the master-slave coordination-based robot control method according to this embodiment will be described in detail below in connection with FIG. 15 and FIG. 16 and the corresponding example job program. Although this embodiment is illustrated with the multi-robot master-slave control system in the field of welding, the present invention does not limit this in any way. In other embodiments, such master-slave coordination control method is also applicable to multi-robot master-slave control systems in other fields.

Example Job Program:
1 NOP //Start line
2 MOV //R1 robot non-master-slave relationship movement instruction
3+MOV //R2 robot non-master-slave relationship movement instruction
4+MOV //S1 positioner non-master-slave relationship movement instruction
5+MOV //S2 positioner non-master-slave relationship movement instruction
6+MOV //S3 positioner non-master-slave relationship movement instruction
7 MOV //R1 robot non-master-slave relationship movement instruction
8+SMOV //R2 robot slave movement instruction
9+MOV //S1 positioner non-master-slave relationship movement instruction
10+MOV //S2 positioner non-master-slave relationship movement instruction
11+MMOV //S3 positioner master movement instruction
12 SMOV //R1 robot slave movement instruction
13+MOV //R2 robot non-master-slave relationship movement instruction
14+MMOV //S1 positioner master movement instruction
15+MOV //S2 positioner non-master-slave relationship movement instruction
16+MOV //S3 positioner non-master-slave relationship movement instruction
17 SMOV //R1 robot slave movement instruction
18+SMOV //R2 robot slave movement instruction
19+MOV //S1 positioner non-master-slave relationship movement instruction
20+MMOV //S2 positioner master movement instruction
21+MOV //S3 positioner non-master-slave relationship movement instruction
22 END //End line In this embodiment, the multi-robot control system shown in FIG. 16 includes five robots, including three positioners (S1, S2, and S3) and two robots (R1 and R2). Step P1: Reads each instruction. Step P2: Convert each instruction into an instruction list. For example, instruction 1 is an operation start instruction, and instructions 2 to 21 are movement instructions of the robots. Step P3: Assemble the movement instructions of the five robots at the same moment into a set of instruction. For example, an instruction set formed by assembling instructions 7 to 11 is: MOV+SMOV+MOV+MOV+MMOV.

In this embodiment, as shown in the example job program, the master-slave information includes a slave status represented by the letter "S", a master status represented by the letter "M", and a non-master-slave status without letter representation. However, the present invention does not limit this in any way. In other embodiments, other identifiers may be used to represent the master, slave, and non-master-slave statuses.

Step P4: Parse the instruction set to obtain: an R1 robot non-master-slave status, an R2 robot slave status, an S1 positioner non-master-slave status, an S2 positioner non-master-slave status, and an S3 positioner master status. In this case, the S3 positioner and the R2 robot realize master-slave control. For example, the R2 robot holds a welding gun to weld a workpiece placed on the S3 positioner.

Then, an instruction reading module reads the next instruction set, i.e. instructions 12 to 16 to obtain SMOV+MOV+MMOV+MOV+MOV. The instruction set is parsed to obtain: an R1 robot slave status, an R2 robot non-master-slave status, an S1 positioner master status, an S2 positioner non-master-slave status, and an S3 positioner non-master-slave status. In this instruction set, the R1 robot may move along with the S1 positioner, and has a master-slave relationship with the S1 positioner, and the R2 robot and the S3 positioner may change from the master-slave relationship in the previous instruction set to non-master-slave relationship, realizing the change of the master-slave relationship for each robot at different moments.

The next instruction set, i.e., instructions 17 to 21, is then read to obtain an instruction set: SMOV+SMOV+MOV+MMOV+MOV. In this case, the R1 robot and the R2 robot move as slaves along with the master, namely the S2 positioner, which once again realizes the change of the master-slave relationship. In addition, master-slave information before MOV of the R1 robot and the R2 robot may be set as "M", so that the R1 robot and the R2 robot become masters.

By means of the master-slave coordination-based robot control method provided by the robot controller 1, the master-slave relationship of each robot may be changed with execution of instructions of the job program. As the master-slave relationship changes with timing of the job program, job instructions of the plurality of robots may be integrated in one job program. Specifically, in a conventional multi-robot control system, in the case that the R1 robot and the R2 robot move as slaves along with the master, namely the S2 positioner, two separate job programs, namely an S2 positioner-R1 robot job program and an S2 positioner-R2 robot job program, are required to control movements of the two robots respectively. The more master-slave relationship groups, the more job programs. The programs are not only complex but also take up more resources for the system to execute the programs. As shown in the example job program, in this embodiment, the control instructions of the R1 robot, the R2 robot, and the S2 positioner may be integrated into one job program, which greatly simplifies the program volume, makes the operation more convenient, and saves the resources for executing the programs.

In the master-slave coordination-based robot control method, the parsed current master-slave information representing the master-slave relationship of each robot is obtained based on the read robot job program. In this way, the user can set the master-slave relationship of each robot via the robot job program. Furthermore, since the robot job program defines the actions of the robots at each moment in term of timing according to the order of execution of the instructions, and the control method of obtaining the master-slave information based on the job program instructions allows the master-slave information of the robots to change with the timing of tasks, flexible change of the master-slave relationship of each robot in different task phases is achieved.

Further, in this embodiment, the current master-slave information of each robot is integrated into corresponding movement instructions in the job program. In master-slave coordination control, the movement trajectory of the slaves changes with the movement trajectory of the master. Therefore, the movement status and master-slave relationship of each robot are closely related, and the combination of the two determines the final movement trajectory of the robot. In this embodiment, the current master-slave information of each robot is integrated into the movement instructions of the robot, so that the master-slave relationship of each robot is changeable in each movement status, and in term of user operations, the user can determine the master-slave relationship of the current robot based on each instruction, which is very convenient. However, the present invention does not limit this in any way. In other embodiments, the master-slave relationship of a robot may be changed periodically according to the needs of a task. In this case, the master-slave information change may be set in a separate instruction rather than integrated into each movement instruction.

Further, the robot controller 1 also controls the servo drive module 3 by using a gain control method based on a robot job program. The servo drive module 3 has a plurality of servo motor drivers for controlling each axis of the robot.

The gain control method based on the robot job program includes: Step S110: Read each instruction in the robot job program in sequence. Step S120: In the case that the read instructions are movement instructions, parse a movement speed, a trajectory type, and trajectory type parameters of the robot in each read movement instruction. Step S130: Acquire corresponding gain parameters based on the parsed movement speed and trajectory type of the robot. Step S140: Based on the parsed movement speed, trajectory type and trajectory type parameters and the corresponding gain parameters, generate robot movement instructions and output the robot movement instructions to the servo motor drivers on each axis of the robot.

In the gain control method based on the robot job program according to the embodiment, the gain parameters in step S130 are acquired based on the parsed movement speed and trajectory type in each read movement instruction in step S120. In this way, the gain parameters may be adjusted according to the trajectory type and movement speed of the robot controller within a task cycle (a job program), so that gain requirements under different trajectory types within a task cycle are met. In this embodiment, the gain parameters include a speed loop gain and a position loop gain. However, the present invention does not limit this in any way. In other embodiments, the gain parameters may also refer to either the speed loop gain or the position loop gain.

Figure 17:
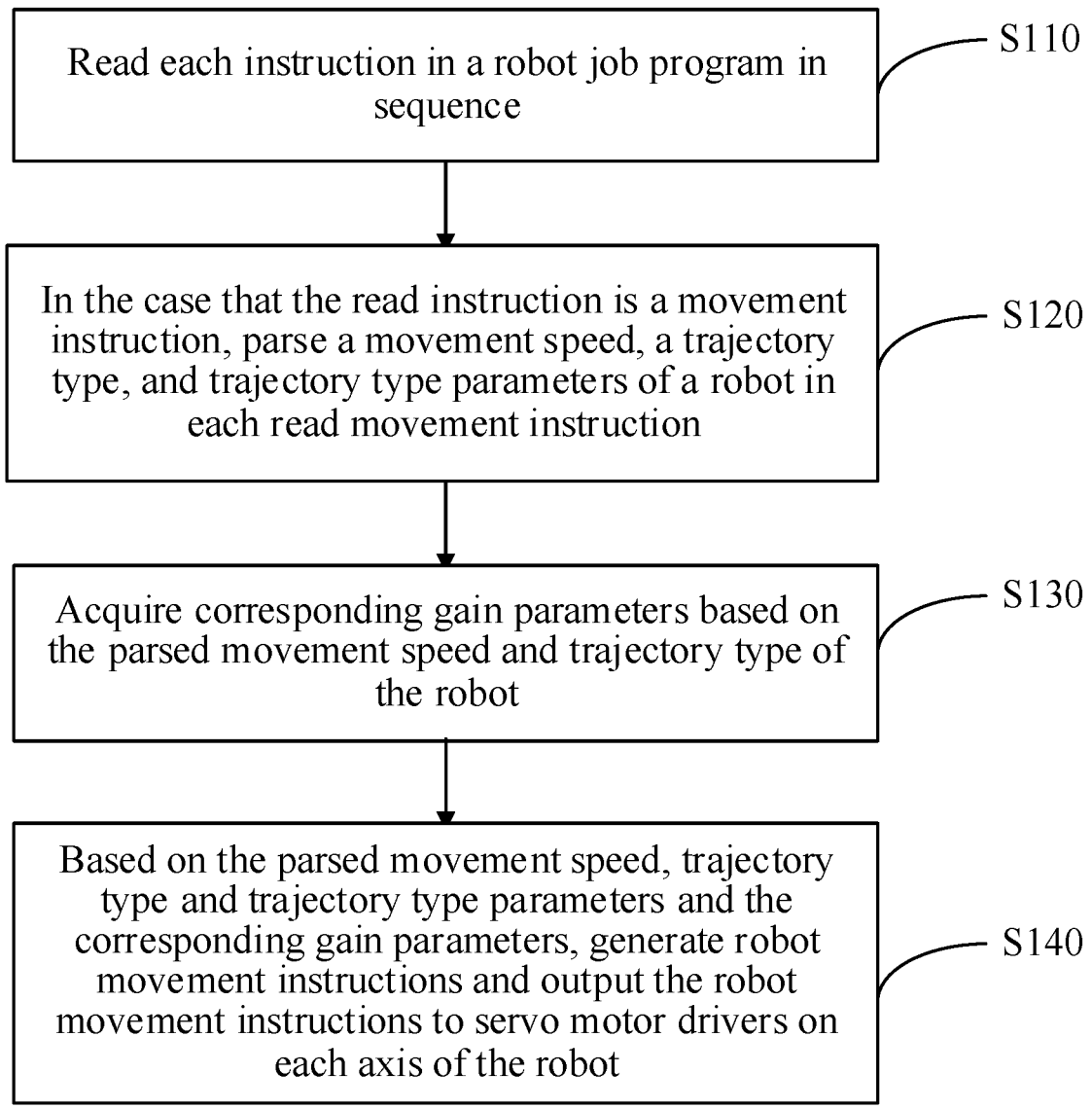
FIG. 17 shows a flow diagram of a gain control method based on a robot job program.

The following program is an example job program for an industrial welding robot. The principle of the servo motor gain parameter control method according to this embodiment will be described in detail below in connection with FIG. 17 and the following example job program. However, the present invention does not limit this in any way. The servo motor gain parameter control method according to this embodiment is also applicable to other types of robots, such as industrial robots for handling operations.

[1] NOP //Start line
[2] MOVJ VJ=80 //General joint movement instruction, joint speed 80%
[3] MOVL V=500 //General linear movement instruction, speed 5 m/min
[4] MOVL V=100 //General linear movement instruction, speed 1 m/min
[5] ARCON ASF #(1)//Arc striking instruction, arc striking file (1)
[6] MOVL V=50 ARC #(1)//Welding linear movement instruction, speed 0.5 m/min, welding file (1)
[7] MOVL V=60 ARC #(2)//Welding linear movement instruction, speed 0.6 m/min, welding file (2)
[8] MOVL V=70 ARC #(1)//Welding linear movement instruction, speed 0.7 m/min, welding file (1)
[9] MOVL V=80 ARC #(3)//Welding linear movement instruction, speed 0.8 m/min, welding file (3)
[10] ARCOFF AEF #(1)//Arc blowout instruction, arc blowout file (1)
[11] MOVL V=200 //General linear movement instruction, speed 2 m/min
[12] MOVJ VJ=80 //General joint movement instruction, joint speed 80%
[13] END //End line The servo motor gain parameter control method according to this embodiment starts with step S110, where each instruction in the robot job program is read in sequence. Specifically, when the instructions are read, the instructions are also converted into an instruction list to be stored into a shared memory. The instruction list includes the type and related parameters of an instruction in each line. The types of the instructions include movement instructions and non-movement instructions (such as a start instruction and an end instruction). In the above example program, the movement instructions include a movement identifier, such as "MOV". During reading of an instruction, the movement identifier is stored into an instruction list corresponding to the instruction in this line. Therefore, whether a read instruction is a movement instruction may be determined through the movement identifier. However, the present invention does not limit this in any way.

In the case that a read instruction is a movement instruction, step S120 is performed, where the movement speed, trajectory type and trajectory type parameters of the robot in each read movement instruction are parsed. The trajectory type includes a jump trajectory and a job trajectory. For the welding robot, the job trajectory is a welding trajectory. In the above example program, the trajectory type of instructions [2] to [4] is a jump trajectory, and the trajectory type of instructions [6] to [9] is a job trajectory. Specifically, in this embodiment, the job trajectory includes an identifier "ARC". Therefore, the trajectory type of a read instruction may be determined based on the identifier during parsing. However, the present invention does not limit this in any way. In other embodiments, other identifiers may also be used for identification.

In the jump trajectory, the trajectory type parameters determine a position after the jump. For the welding trajectory, different welding parameters are needed for different workpieces, such as the angle of the welding gun and the height of a wire from the workpiece surface. These parameters are the trajectory type parameters. In this embodiment, the trajectory type parameters are pre-configured in a storage file of the robot controller, and each read movement instruction is parsed based on the trajectory type or a name of the trajectory type parameter storage file included in the instruction, so as to obtain corresponding trajectory type parameters. In this embodiment, in the case that a parsed read movement instruction represents that the robot under this instruction is in a job trajectory, the corresponding trajectory type parameters are obtained by parsing based on the name of the trajectory type parameter storage file included in the movement instruction. Specifically, in the above example job program, "ARC (1)" in an instruction in line 6 indicates that "welding file (1)" is called for welding, and "welding file (1)" is the name of the trajectory type parameter storage file.

In the case that the instruction is in the jump trajectory after parsing, the trajectory type parameter storage file corresponding to the jump trajectory is acquired from the shared memory. For example, in an instruction in line 2, the robot is in a joint movement status in the jump trajectory. In this case, a parsing unit directly acquires the trajectory type parameter storage file pre-configured for the joint movement from the shared memory. The trajectory type parameters include the angle and direction of the joint movement, etc. In the case that the jump trajectory is linear movement, the trajectory type parameters include the orientation of the linear movement, etc. However, the present invention does not limit this in any way.

After the movement speed and trajectory type of the robot in the read instruction are obtained in step S120, step S130 is performed, where corresponding gain parameters are acquired based on the movement speed and trajectory type of the robot. In this embodiment, a gain table related to the movement speed, the trajectory type and the gain parameters is pre-stored in the shared memory of the robot controller, and a movement control planning unit acquires corresponding gain parameters by querying the gain table. However, the present invention does not limit this in any way. In other embodiments, corresponding gain parameters at the current movement speed may also be obtained based on the movement speed of the robot under the current instruction according to a preset algorithm. With gain parameters obtained based on the movement speed and trajectory type in each instruction, the robot controller has a low gain for a high-speed jump trajectory in lines [2] to [4] to meet the stability requirement, and has a high gain for a low-speed job trajectory in lines [6] to [9] to meet the accuracy requirement. Further, instructions in each of lines [6] to [9] may also have different gains.

Finally, step S140 is performed, where the robot movement instructions are generated based on the parsed movement speed, trajectory type and trajectory type parameters and the corresponding gain parameters, and the robot movement instructions are output to the servo motor drivers on each axis of the robot. Preferably, the generated robot movement instructions are output to the servo motor drivers on each axis of the robot via an EtherCAT bus interface. EtherCAT, as a movement control bus interface, provides short communication cycles and fast communication, and allows real-time adjustment of speed loop gain and position loop gain parameters of each axis motor within each control cycle and sending of the parameters to the servo motor drivers of each axis motor of the robot for real-time closed loop gain control.

Corresponding to the above servo motor gain parameter control method, a servo motor gain parameter control module in the robot controller 1 includes an instruction reading unit, the parsing unit, the movement control planning unit, and a movement instruction generation unit. The instruction reading unit reads each instruction in the robot job program in sequence. When the read instructions are movement instructions, the parsing unit parses the movement speed, trajectory type and trajectory type parameters of the robot in each read movement instruction. The movement control planning unit acquires corresponding gain parameters based on the parsed movement speed and trajectory type of the robot. The movement instruction generation unit generates robot movement instructions based on the parsed movement speed, trajectory type and trajectory type parameters and the corresponding gain parameters, and outputs the robot movement instructions to the servo motor drivers on each axis of the robot.

In this embodiment, after the movement speed and the trajectory type are parsed by the parsing unit, the movement control planning unit queries the preset gain table to obtain the corresponding gain parameters. However, the present invention does not limit this in any way. In other embodiments, the movement control planning unit may also obtain the corresponding gain parameters at the current movement speed according to the preset algorithm based on the movement speed of the robot under the current instruction, so as to achieve stable control of high-speed movement and precise control of low-speed movement.

In this embodiment, the trajectory type parameters are pre-configured in the storage file of the robot controller, and each read movement instruction is parsed based on the trajectory type or the name of the trajectory type parameter storage file included in the instruction, so as to obtain the corresponding trajectory type parameters.

In this embodiment, the movement instruction generation unit is connected to the servo motor drivers on each axis of the robot via the data transmission module, and the movement instruction generation unit generates the robot movement instructions and outputs the robot movement instructions to the servo motor drivers on each axis of the robot via the EtherCAT bus transmission master 21. Specifically, each servo motor driver becomes a slave of the EtherCAT bus transmission master 21 through a dedicated EtherCAT slave control chip (such as a chip of AX58100 series). However, the present invention does not limit this in any way.

The servo motor gain parameter control system according to this embodiment uses the servo motor gain parameter control method from step S110 to step S140 according to this embodiment to control the servo motor driver, which will not be described here.

In this embodiment, the servo motor gain parameter control method acquires the corresponding gain parameters by parsing the movement speed and movement trajectory in each movement instruction, and the gain parameters are adjusted in real time with the movement speed and movement trajectory of the robot. Therefore, low gain parameters are used under the high-speed jump trajectory to ensure the stability of high-speed movement, and high gain parameters are used under the low-speed job trajectory to meet movement accuracy. Further, based on adjustment of the gain parameters of each movement instruction, the movement speed and trajectory type of the robot may be acquired very easily and accurately, which greatly reduces the difficulty and cost of gain control.

In summary, the power module in the general-purpose computer-based robot control system according to the present invention continues to supply power to the robot controller after the main circuit is powered off, so as to cause the operation modules in the robot controller to complete data storage, thereby realizing power-off protection of the data. The safety unit provides control with the plurality of safety circuits to ensure that the servo drive module can accurately respond to abnormal inputs or failures, thereby enabling emergency stops. Further, since the safety unit and the bus transmission master monitor each other, in the case that either the safety unit or the bus transmission master fails, the servo drive module can respond to the failure, realizing safety interlocked control of a plurality of modules and greatly improving the level of safety control. In the data transmission module, the combination of the first interface module extended based on the bus transmission master with the standard second interface module not only realizes the rapid transmission of data requiring high response, but also greatly reduces the cost of the transmission module. On the demonstrator, the demonstrator program runs on the robot controller, and the demonstrator receives the terminal video signal from the robot controller to achieve real-time display of the operation status of the robot. In this solution, there is no need to embed a separate CPU in the demonstrator, so that the cost of the demonstrator is greatly reduced. In addition, as the demonstrator program is executed by a high-performance industrial personal computer in the robot controller, the program has very powerful operational capabilities and high operational speed, thus enabling better and more accurate control of robot movements.

Although the present invention has been described with reference to the above preferred embodiments, the present invention is not to be restricted by the preferred embodiments. It will be understood by those skilled in the art that various changes and modifications may be made without departing from the spirit and scope of the present invention as defined by the appended claims.

What is claimed is:

1. A general-purpose computer-based robot control system, comprising:
    a robot controller and a data transmitter;
    a servo driver, connected to the robot controller via the data transmitter and receiving a movement instruction from the robot controller to drive a robot to move;
    a safety unit, connected to the robot controller and the servo driver respectively via the data transmitter, and upon receiving an abnormal input signal or a failure signal, turning off output of the servo driver and transmitting the abnormal input signal or the failure signal to the robot controller;
    a teaching pendant, receiving a terminal video signal and a first control interaction signal from the robot controller, and at the same time, sending a second control interaction signal to the robot controller to control operation of the robot controller; and
    a power module, electrically connected to the robot controller and the safety unit;
    wherein the safety unit, the servo driver, and a master for bus transmission in the data transmitter are interconnected, the safety unit and the master for bus transmission monitor each other, a first safety circuit is established between the safety unit and the servo driver, and a second safety circuit is established between the master for bus transmission and the servo driver;
    a first safety control signal is generated in the first safety circuit to turn off the output of the servo driver in the case that the safety unit receives the abnormal input signal, or monitors that the master for bus transmission fails or the safety unit fails; and
    at the same time, a second safety control signal is generated in the second safety circuit to turn off the output of the servo driver in the case that the master for bus transmission receives the abnormal input signal from the safety unit, or monitors that the master for bus transmission fails or the safety unit fails.

2. The general-purpose computer-based robot control system according to claim 1, wherein a real-time operation module in the robot controller is connected to the master for bus transmission; and in the case that the real-time operation module fails:
    the master for bus transmission outputs the first safety control signal via the first safety circuit to turn off the output of the servo driver, and at the same time, outputs a failure signal of the real-time operation module to the safety unit; and
    the safety unit outputs the second safety control signal via the second safety circuit to turn off the output of the servo driver.

3. The general-purpose computer-based robot control system according to claim 2, wherein the robot controller further comprises a non-real-time operation module; and
    in the case that the non-real-time operation module fails, the real-time operation module acquires a failure signal of the non-real-time operation module and outputs the failure signal to the master for bus transmission, and the master for bus transmission turns off the output of the servo driver via the first safety circuit and the second safety circuit.

4. The general-purpose computer-based robot control system according to claim 3, wherein the robot controller further has a storage module, the real-time operation module and the non-real-time operation module share the storage module, and the real-time operation module and the non-real-time operation module acquire live signals of the other party via the shared storage module respectively so as to monitor statuses of the other party.

5. The general-purpose computer-based robot control system according to claim 2, wherein the non-real-time operation module is connected to the safety unit, and the safety unit monitors a status of the non-real-time operation module;
    in the case that the real-time operation module fails, the non-real-time operation module outputs the failure signal to the safety unit, and the safety unit outputs the first safety control signal to turn off the output of the servo driver; and
    in the case that the non-real-time operation module fails, the safety unit outputs the first safety control signal to turn off the output of the servo driver upon detecting the failure signal.

6. The general-purpose computer-based robot control system according to claim 5, wherein the safety unit transmits the abnormal input signal to the non-real-time operation module in response to receiving the abnormal input signal, the non-real-time operation module transmits the abnormal input signal to the real-time operation module via a storage module, and the real-time operation module triggers the master for bus transmission to output the second safety control signal to turn off the output of the servo driver.

7. The general-purpose computer-based robot control system according to claim 1, wherein the power module comprises:
    a power conversion circuit;
    a controller power module, connected to an output end of the power conversion circuit and supplying power to the robot controller;
    a network voltage detection module, connected to the power conversion circuit to detect an input voltage of the power conversion circuit, in the case that a main circuit is powered off and the input voltage of the power conversion circuit is below a set threshold, the power module with a power-off protection function outputting a power-off trigger signal to trigger the robot controller for power-off storage; and
    an energy storage module, connected to the controller power module, the energy storage module storing energy during normal operation of the power conversion circuit; in the case that the input voltage of the power conversion circuit is below the set threshold, the energy storage module outputting the energy to cause the controller power module to operate normally, the controller power module supplying power to the robot controller to cause the robot controller to complete data storage.

8. The general-purpose computer-based robot control system according to claim 7, wherein the energy storage module comprises a capacitor connected between a positive bus and a negative bus of the power conversion circuit, and the capacitor is charged during normal power supply of the power conversion circuit; and in the case that the input voltage of the power conversion circuit is below the set threshold, the capacitor releases energy to the controller power module to cause the controller power module to operate normally.

9. The general-purpose computer-based robot control system according to claim 7, wherein the power module further comprises an output capacitor in crossover connection with an output end of the controller power module, the output capacitor stores energy during the normal operation of the power conversion circuit, and in the case that the input voltage of the power conversion circuit is below the set threshold, the output capacitor discharges, and the energy released by the output capacitor is superimposed with the energy output by the energy storage module and then output to the robot controller.

10. The general-purpose computer-based robot control system according to claim 7, further comprising a power timing management unit, wherein the power timing management unit comprises:
    a power determining module, determining an output status of the power module in the case that the main circuit is powered on again after being powered off;
    a controller determining module, determining whether the robot controller is turned off in the case that the power module is in a power-off protection output status; and
    a timing control module, outputting a power-on trigger signal to the robot controller to cause the robot controller to restart operation modules in the case that the robot controller is turned off, and monitoring a status of a demonstrator program in the robot controller or a power-off signal of a main board of the robot controller in real time in the case that the robot controller is still not turned off;
    wherein upon monitoring that the demonstrator program is closed, the robot controller is turned off after a delay for a preset time, and the power-on trigger signal is output to the robot controller to cause the robot controller to restart the operation modules after the delay is over;
    or wherein the power-on trigger signal is output to the robot controller to cause the robot controller to restart the operation modules upon receiving the power-off signal of the main board of the robot controller.

11. The general-purpose computer-based robot control system according to claim 10, wherein in the case that the power module is in the power-off protection output status and the robot controller is still not turned off, the timing control module monitors and determines a live signal output from the demonstrator program in the robot controller at intervals, and determines that the demonstrator program is closed in the case that no live signal is received within a preset interval.

12. The general-purpose computer-based robot control system according to claim 11, wherein in the case that the robot controller is turned off, the timing control module opens and then closes a path between the power module and the robot controller, so as to provide the power-on trigger signal with a rising edge for the robot controller.

13. The general-purpose computer-based robot control system according to claim 10, wherein in the case that the main circuit is powered off, the power module enters the power-off protection output status and outputs the power-off trigger signal to the robot controller, so as to trigger the robot controller for the power-off storage.

14. The general-purpose computer-based robot control system according to claim 1, wherein the teaching pendant comprises:
    a receiver, receiving the terminal video signal and the first control interaction signal from the robot controller;
    a display, displaying the received terminal video signal on the teaching pendant, and in response to the received first control interaction signal, displaying information of the first control interaction signal in a corresponding display region on the teaching pendant;
    an input signal acquisitor, acquiring a signal input by a panel of the teaching pendant or a signal input from other terminals to form the second control interaction signal; and
    a sender, sending the second control interaction signal to the robot controller to control the operation of the robot controller.

15. The general-purpose computer-based robot control system according to claim 14, wherein the teaching pendant further comprises:
    a decoder, electrically connected to the receiver and outputting the terminal video signal and the first control interaction signal output from the receiver to the display after decoding processing; and
    an encoder, electrically connected to the input signal acquisitor and outputting the second control interaction signal to the sender after encoding.

16. The general-purpose computer-based robot control system according to claim 1, wherein the data transmitter comprises:
    the master for bus transmission, connected to the robot controller, the robot controller being connected to a plurality of drive modules via the master for bus transmission to control a movement status of the robot;
    a first interface, connected to the robot controller via the master for bus transmission and transmitting a first type of signals; and
    a second interface, connected to the robot controller and transmitting a second type of signals, the first interface having a higher transmission speed than the second interface, the robot controller having a higher response level to the first type of signals than to the second type of signals.

17. The general-purpose computer-based robot control system according to claim 16, wherein a bus transmission communication network is an EtherCAT network, the master for bus transmission is an EtherCAT master, and the first interface and the plurality of drive modules are used as EtherCAT slaves of the master for bus transmission.

18. The general-purpose computer-based robot control system according to claim 1, wherein the robot controller controls the servo driver by using a master-slave coordination-based robot control method, and the master-slave coordination-based robot control method comprises:
    reading instructions in a robot job program;
    parsing the read instructions to obtain number information of each robot, current movement information, and set current master-slave information representing a master-slave relationship of each robot;

matching corresponding movement parameters for each robot from a movement parameter profile based on the parsed number information, current movement information, and current master-slave information of each robot; and based on the matched movement parameters of each robot and the current master-slave information, calling a master-slave coordination control algorithm for master-slave coordination control.

19. The general-purpose computer-based robot control system according to claim 1, wherein the robot controller controls the servo driver by using a gain control method based on a robot job program, and the gain control method based on the robot job program comprises:

reading each instruction in the robot job program in sequence;

in the case that the read instruction is a movement instruction, parsing a movement speed, a trajectory type, and trajectory type parameters of the robot in each read movement instruction;

acquiring corresponding gain parameters based on the parsed movement speed and trajectory type of the robot; and based on the parsed movement speed, trajectory type and trajectory type parameters and the corresponding gain parameters, generating robot movement instructions and outputting the robot movement instructions to servo motor drivers on each axis of the robot.

20. The general-purpose computer-based robot control system according to claim 3, wherein the non-real-time operation module is connected to the safety unit, and the safety unit monitors a status of the non-real-time operation module;

in the case that the real-time operation module fails, the non-real-time operation module outputs the failure signal to the safety unit, and the safety unit outputs the first safety control signal to turn off the output of the servo driver; and in the case that the non-real-time operation module fails, the safety unit outputs the first safety control signal to turn off the output of the servo driver upon detecting the failure signal.

* * * * *